(12) United States Patent
Ng et al.

(10) Patent No.: US 11,567,666 B2
(45) Date of Patent: Jan. 31, 2023

(54) HANDLING THE MIGRATION OF PAGES OF MEMORY ACCESSIBLE BY INPUT-OUTPUT DEVICES

(71) Applicant: ATI Technologies ULC, Markham (CA)

(72) Inventors: Philip Ng, Toronto (CA); Nippon Raval, Mississauga (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/211,036

(22) Filed: Mar. 24, 2021

(65) Prior Publication Data
US 2022/0308755 A1     Sep. 29, 2022

(51) Int. Cl.
*G06F 3/06* (2006.01)
(52) U.S. Cl.
CPC ............ *G06F 3/061* (2013.01); *G06F 3/0604* (2013.01); *G06F 3/0647* (2013.01); *G06F 3/0685* (2013.01)
(58) Field of Classification Search
CPC ......... G06F 3/061; G06F 3/0647–0649; G06F 3/0685
See application file for complete search history.

(56) References Cited

U.S. PATENT DOCUMENTS

| | | | |
|---|---|---|---|
| 2007/0260768 A1* | 11/2007 | Bender | G06F 13/28 710/22 |
| 2018/0232320 A1* | 8/2018 | Raval | G06F 12/1081 |

* cited by examiner

*Primary Examiner* — Chie Yew
(74) *Attorney, Agent, or Firm* — Park, Vaughan, Fleming & Dowler LLP

(57) ABSTRACT

An electronic device includes a memory, a processor that executes a software entity, a page migration engine (PME), and an input-output memory management unit (IOMMU). The software entity and the PME perform operations for preparing to migrate a page of memory that is accessible by at least one IO device in the memory, the software entity and the PME set migration state information in a page table entry for the page of memory and information in reverse map table (RMT) entries involved with migrating the page of memory based on the operations being performed. The IOMMU controls usage of information from the page table entry and controls performance of memory accesses of the page of memory based on the migration state information in the page table entry and information in the RMT entries. When the operations for preparing to migrate the page of memory are completed, the PME migrates the page of memory in the memory.

22 Claims, 6 Drawing Sheets

HANDLING THE MIGRATION OF PAGES OF MEMORY ACCESSIBLE BY INPUT-OUTPUT DEVICES

BACKGROUND

Related Art

Some electronic devices include a processor (e.g., a central processing unit, etc.) that performs computational, control, memory access, and other operations, along with a memory in which data is stored (where "data" is used as a generic term for information such as program code instructions, input or result data for and from computational operations, constant values, etc.). Many of such electronic devices also include input-output (IO) devices such as network interface devices, disk controllers, etc. The IO devices can interact with the processor and memory for performing various operations. For example, a network interface device may store data received via a network in the memory and then signal the processor that the data stored in the memory is awaiting processing.

In some cases, data stored in the memory in an electronic device can be stored in the memory in such a way that accessing the data is inefficient. For example, the memory may be implemented using a combination of two different types of memory, one of the types of memory being a faster access but more costly type of memory and the other being a slower access but less costly type of memory. An inefficiency can arise in such a memory when often accessed, high priority, and/or time critical data is stored in the slower type of memory or vice versa. As another example, an inefficiency can arise when data is stored in a remote part of the memory such as a portion of the memory in a remote socket of a non-uniform memory access (NUMA) electronic device.

Because inefficiencies in accessing data in memory can impact the overall performance of an electronic device, some electronic devices include a migration mechanism for dynamically relocating, or "migrating," data in memory so that data is stored in more appropriate locations in memory. For example, data in memory may be organized into contiguous blocks of data, or "pages of memory," of specified sizes (e.g., 4 KiB, 2 MiB, etc.) for the purposes of memory management and migration. A migration mechanism can monitor the accesses of the pages of memory and selectively migrate the pages of memory based on specified patterns or characteristics of the accesses of the pages of memory. For example, in an electronic device with the above-described two different types of memory, when a page of memory that is stored in a lower speed type of memory is being accessed sufficiently often, the migration mechanism can migrate the page of memory from the lower speed type of memory to a higher speed type of memory. In some electronic devices, the migration mechanisms migrate pages of memory automatically and of their own accord—and thus pages of memory can be migrated without communicating information about the migration to each of the accessing entities with access to the pages of memory (e.g., processors, IO devices, etc.). In other words, the migration mechanisms migrate pages of memory "behind the scenes," without each of the accessing entities necessarily having direct knowledge of, granting approval for, and/or being party to the migration.

In some electronic devices, some or all IO devices do not provide support for migrating pages of memory. For example, the IO devices may be older or simpler IO devices that do not include software and/or hardware support for handling faults (e.g., page faults, etc.) that can occur when pages of memory are found to be temporarily unavailable as the pages of memory are migrated. If a page of memory accessible to such an IO device was to be migrated and the IO device attempted to access the page of memory or information associated with the page of memory (e.g., address translation information, etc.) during migration, the IO device and/or other functional blocks and devices in the electronic device (e.g., the processor, etc.) may crash, experience errors, or operate in an unexpected or undesirable way.

BRIEF DESCRIPTION OF THE FIGURES

Throughout the figures and the description, like reference numerals refer to the same figure elements.

DETAILED DESCRIPTION

Figure 1:
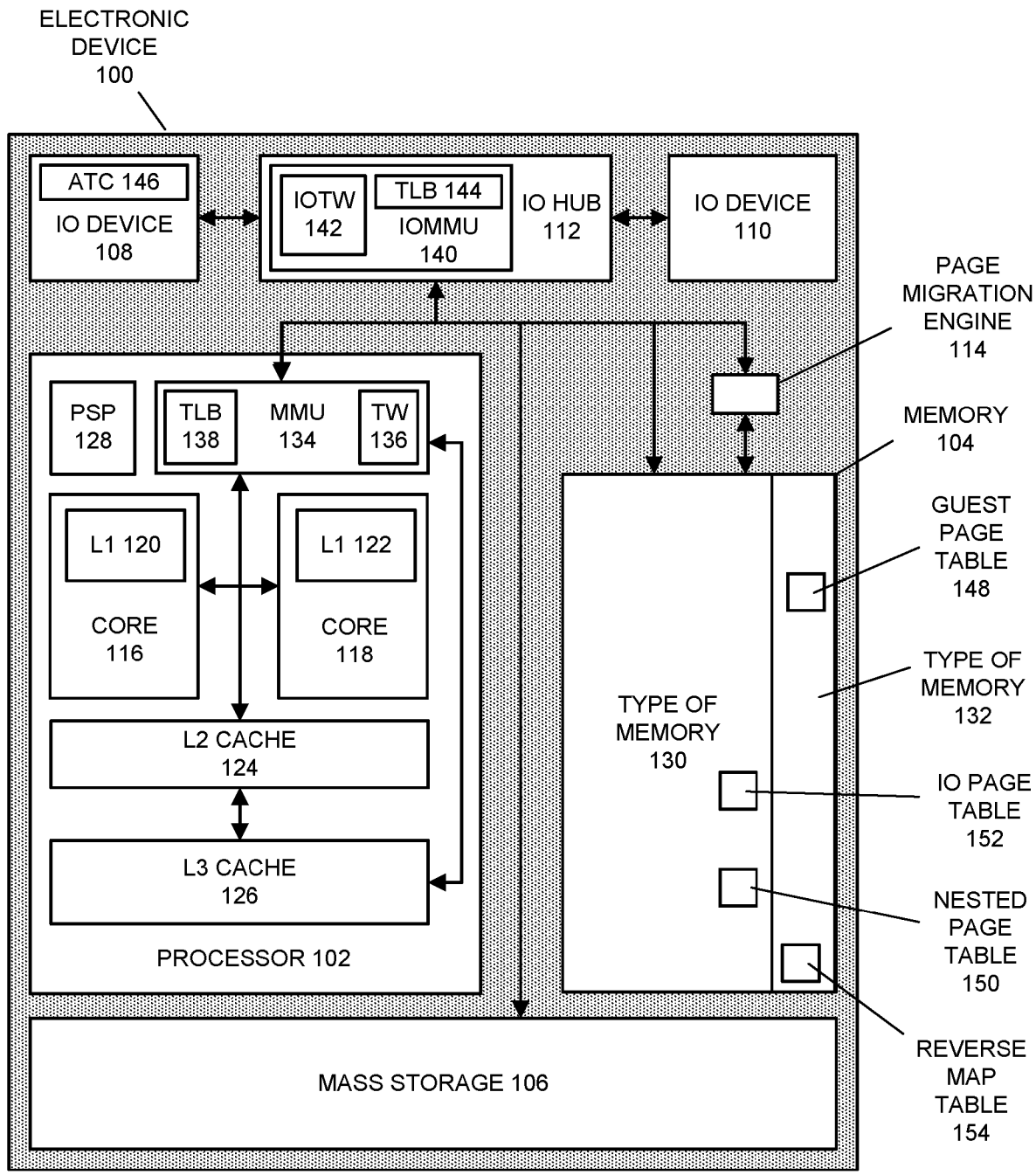
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of one of the terms. Note that this term may have significant additional aspects that are not recited herein for clarity and brevity and thus the description is not intended to limit this term.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Data: data is a generic term that indicates information that can be stored in memories and/or used in computational, control, and/or other operations. Data includes information such as actual data (e.g., results of computational or control operations, outputs of processing circuitry, inputs for computational or control operations, variable values, sensor values, etc.), files, program code instructions, control values, and/or other information Data can be organized into logical blocks (e.g., a 4 KiB or 2 MiB page of memory, etc.) that include one or more of the above-described types of information for operations such as loading the data into a memory, migration of data in a memory, etc.

Accesses: accesses, as applied to interactions with data stored in memories (e.g., main memories, cache memories, etc.), or "memory accesses," indicates all forms of interactions that can be performed for, on, using, and/or with data and corresponding metadata and/or control values. For example, accesses can include reads or loads of data from memories, writes or stores of data to memories, invalidations or deletions of data in memories, reads or writes of metadata for data in memories, changes of status, coherency state, or permissions for data in memories, etc. When a particular type of memory access is allowed/permitted for a given functional block or device, the data is "accessible" to the given functional block or device.

Virtual Memory

In the described embodiments, an electronic device uses a virtual memory technique for handling data accesses by software entities being executed in the electronic device (e.g., application programs, operating systems, device drivers, virtual machines, etc.) or by input-output (IO) devices (e.g., network interface devices, Peripheral Component Interface Express (PCIe) bus devices, disk controllers, etc.). Generally, when data is initially accessed by a software entity or an IO device, a block or page of memory of a given size (e.g., 4 KiB, 2 MiB, etc.) that includes the data is copied from mass storage (e.g., a disk drive or a non-volatile semiconductor memory) to an available physical location in a memory (e.g., a main memory) in the electronic device or a page of memory is newly created in the memory (e.g., for storing the results of computational or other operations, etc.). In order to avoid software entities and IO devices being required to keep track of the physical locations of pages in memory, the electronic device keeps track of the physical locations of the pages for the software entities or IO devices. The software entities and IO devices access memory using "virtual" addresses in virtual address spaces, which are local address spaces that are specific to corresponding software entities and/or IO devices, instead of accessing memory using addresses based on the physical locations (or physical addresses) of data in the memory. From a software entity's or an IO device's perspective, virtual addresses indicate the actual physical locations where data is stored in memory, and memory accesses are made by software entities and IO devices using the virtual addresses accordingly. The virtual addresses, however, may not map directly to the physical addresses of the physical locations where data is stored in pages in the memory. As part of keeping track the physical locations of pages, the electronic device translates the virtual addresses used by the software entities and IO devices in memory access requests into the physical addresses where the data is actually located. The electronic device then uses the physical addresses to perform the memory accesses for the software entities and IO devices.

In order to enable the above-described virtual address to physical address translations, the electronic device includes a page table. The page table is a record stored in a memory of the electronic device that includes an entry, or a "page table entry," with virtual address to physical address translation information and other information for pages of data that are stored in the memory. In other words, the page table includes mappings of virtual addresses to corresponding physical addresses for each page of data that is present in the memory. Upon receiving a request from a software entity or an IO device to access memory at a given virtual address, the electronic device acquires corresponding physical address information from the page table by performing a page table walk, during which the page table is searched for a page table entry that provides the physical address associated with the virtual address. For example, upon receiving a request from an operating system to access memory at a given virtual address, a memory management unit (MMU) in a central processing unit (CPU) core in the electronic device can perform a page table walk to acquire corresponding physical address information from the page table and can process the memory access using the physical address information. As another example, upon receiving a request from an IO device to access memory at a given virtual address, an input-output memory management unit (IOMMU) in the electronic device can perform a page table walk to acquire corresponding physical address information from the page table and can process the memory access using the physical address information.

Because the above-described page table walks are relatively slow, it is desirable to avoid performing page table walks. The electronic device therefore includes translation lookaside buffers (TLBs), which are local caches that are used for storing a limited number of copies of address translation information acquired during page table walks (i.e., information based on page table entries). For example, a CPU can include a TLB that is used for locally storing copies of information based on page table entries (or copies of the page table entries themselves) that is used for memory accesses for software entities. As another example, an IOMMU can include a TLB that is used for locally storing copies of information based on page table entries (or copies of the page table entries themselves) that is used for memory accesses for IO devices. During operation, the CPU core or IOMMU first attempts to acquire cached page table entries from the corresponding TLB for performing virtual address to physical address translations. When the copy of the corresponding page table entry is not present in the TLB (i.e., when a "miss" occurs), the CPU core or IOMMU performs a page table walk to acquire the desired page table entry. The CPU core or IOMMU can then cache a copy of the acquired page table entry in the respective TLB for subsequent use.

In some embodiments, the IOMMU and IO devices support communication protocols for address translation such as PCI Express (PCIe) Address Translation Services (ATS). For ATS, input-output (IO) devices can include respective local caches, or "address translation caches" (ATCs), that each IO device uses for storing copies information based on page table entries (or the page table entries themselves). When an IO device desires a local copy of information based on a page table entry (or, more simply, a copy of the entire page table entry), the IO device requests the information based on the page table entry from the IOMMU. The IOMMU checks to ensure that the IO device is permitted to have the information and then provides the information based on the page table entry to the IO device. The IO device next stores the information based on the page table entry in the ATC for subsequent use. Using the ATC, therefore, IO devices can avoid the need for repeatedly requesting information based on page table entries from the IOMMU. In some embodiments, e.g., for "secure" ATS, the IOMMU does not provide system physical addresses from page table entries to requesting IO devices, but instead provides guest physical addresses. In these embodiments, the IOMMU provides the guest physical addresses, which must be translated by the IOMMU into system physical addresses for memory accesses, in order to avoid providing IO devices with system physical addresses that can be used by the IO devices to access memory directly (and without certain security checks by the IOMMU).

Virtual Machines and Hypervisors

In some embodiments, a processor in an electronic device executes one or more virtual machines. Virtual machines are software entities that emulate or otherwise interface with the processor and other functional blocks and devices in the electronic device (e.g., memories, JO devices, etc.) in order to provide support for executing software programs. For example, a virtual machine may provide support for running one or more instances of operating systems, called guest operating systems. The guest operating systems in turn provide support for executing other software programs such as applications, databases, etc.

Figure 3:
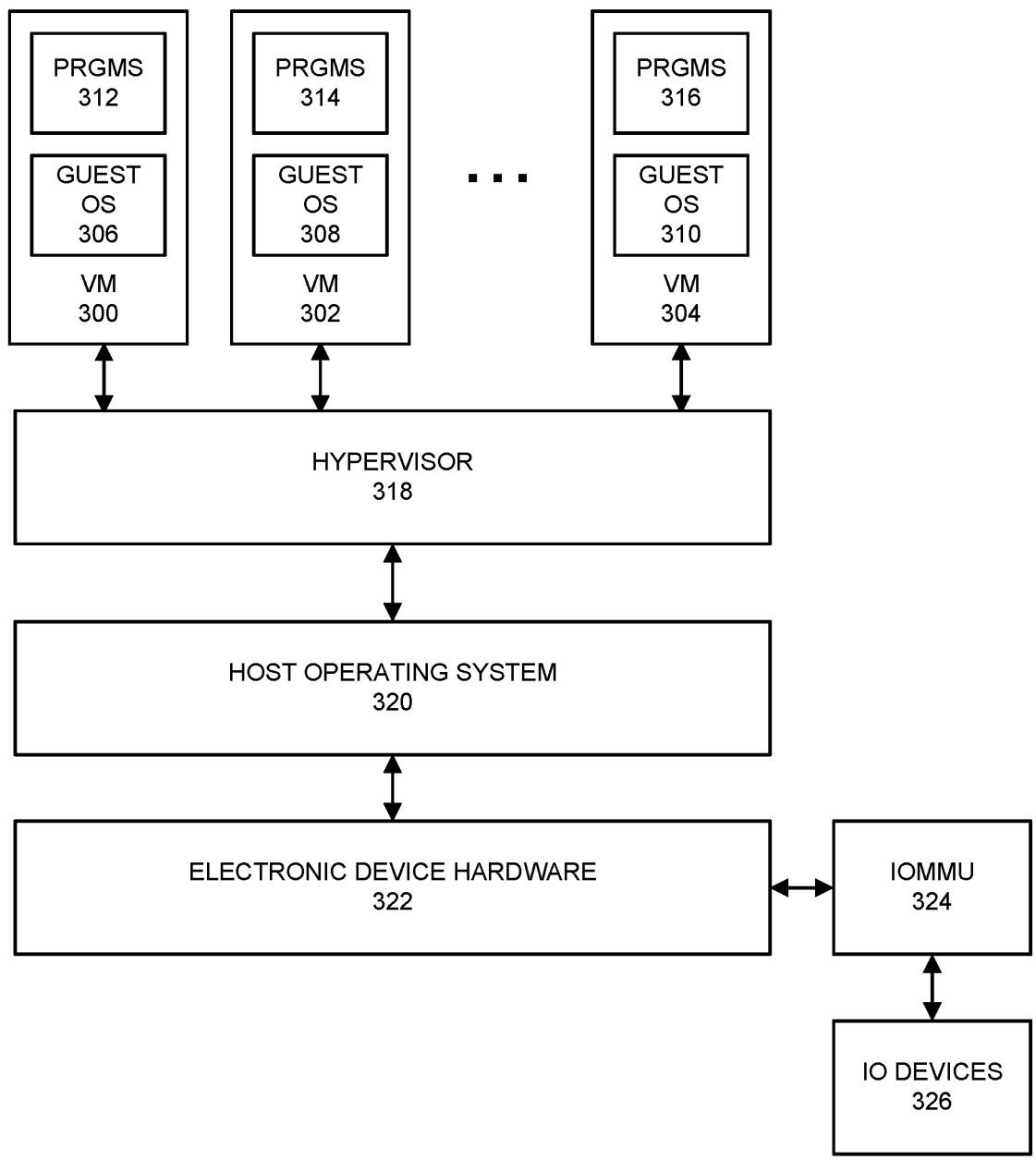
FIG. 3 presents a block diagram illustrating a hypervisor and functional blocks and devices in an electronic device in accordance with some embodiments.

In some embodiments, the processor also executes a hypervisor. The hypervisor is a software entity that performs operations for controlling and managing the execution of virtual machines. For example, the hypervisor may start and initialize virtual machines, assist with controlling accesses of functional blocks and devices in the electronic device by virtual machines (e.g., dictate which regions of memory and/or JO devices the virtual machines are allowed to access, etc.), terminate or close virtual machines, etc. An arrangement of virtual machines and hypervisors as can be found in some embodiments is shown in FIG. 3.

Page Tables

In the some embodiments, guest operating systems, IO devices, the IOMMU, and the hypervisor in an electronic device use the virtual memory technique for memory accesses. Programs executed under guest operating systems, the guest operating systems themselves, and IO devices can use local addresses for memory accesses. For example, programs executed under a guest operating system can access memory using guest virtual addresses and JO devices can access memory using guest physical addresses. As described above, the local addresses in memory accesses from programs, guest operating systems, and JO devices are to be translated before data can be accessed in the memory. For example, guest virtual addresses in memory accesses from programs can be translated into guest physical addresses. The guest physical addresses, however, are themselves virtual—i.e., are the guest operating systems' view of the organization of data in the memory—and so the guest physical addresses are translated into system physical addresses where data is located in the memory. As another example, guest physical addresses in memory accesses from IO devices can be translated into system physical addresses where the data is located in the memory.

In order to support the programs, in some embodiments, guest operating systems, and IO devices using local addresses, the electronic device uses a set of page tables for address translations. The page tables include a guest page table for each guest operating system that is used for translating guest virtual addresses in memory accesses from programs to guest physical addresses. The page tables also include a nested (i.e., host, system, etc.) page table that is used for translating guest physical addresses in memory accesses from guest operating systems into system physical addresses. The page tables additionally include an IO page table that is used for translating guest physical addresses in memory accesses from IO devices into system physical addresses. Note, however, that, in some embodiments, the information in the IO page table is included in/combined with the information in the nested page table and the nested page table is used for all translations of guest physical addresses to system physical addresses.

As an example of the use of the above-described page tables for translating addresses, in some embodiments, upon receiving a memory access request from a program that includes a guest virtual address via a guest operating system, a processor uses the guest page table and the nested page table in sequence for performing the translation. In other words, the processor (e.g., a guest operating system) first uses the guest page table to translate the guest virtual address into a guest physical address. The processor (e.g., a hypervisor) then uses the nested page table to translate the guest physical address into a system physical address. Upon acquiring the system physical address, the processor uses the system physical address for performing the memory access. The processor may also cache the system physical address in a TLB in the processor.

As another example of the use of the above-described page tables for translating addresses, in some embodiments, upon receiving a memory access request from an IO device that includes a guest physical address, an IOMMU uses the IO page table for performing the translation. In other words, the IOMMU uses the IO page table to translate the guest physical address into a system physical address. Upon acquiring the system physical address, the IOMMU uses the system physical address for performing the memory access. The IOMMU may also cache the system physical address in a TLB in the IOMMU.

Reverse Map Table

Figure 6:
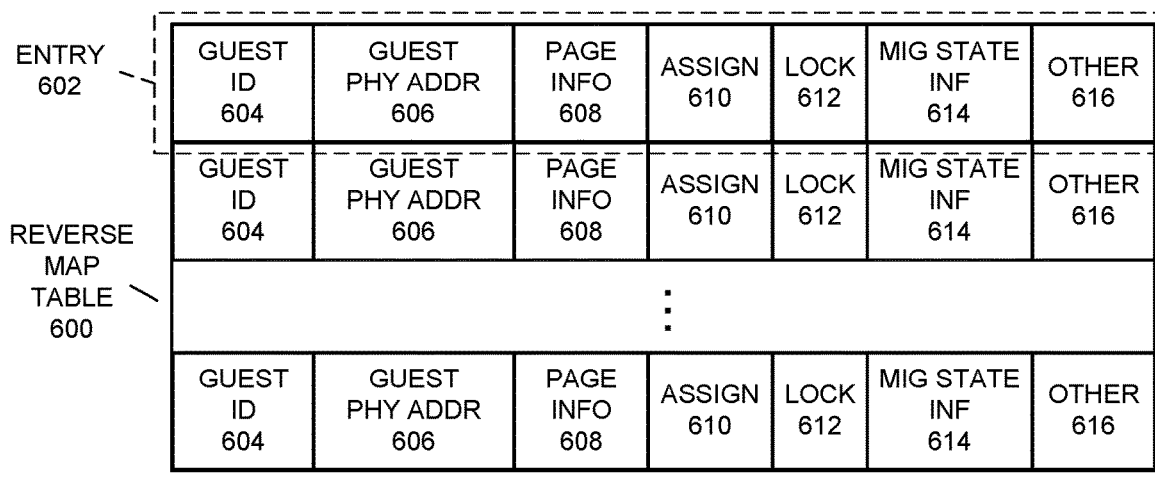
FIG. 6 presents a block diagram illustrating a reverse map table in accordance with some embodiments.

In the described embodiments, the hypervisor (and/or other software entities, functional blocks, and/or devices) can modify information in the nested page table. For example, hypervisor can change mappings from guest physical addresses to system physical addresses in the nested page table. Such changes are normal and necessary when properties of pages of memory are modified, such when pages of memory are moved in the memory, the ownership of pages of memory is changed, etc. Because the hypervisor can change information in the nested page table, if the hypervisor were to maliciously or erroneously change information in page table entries, the electronic device could experience unintended or unexpected operation. For example, if the hypervisor remapped a page of memory for a guest operating system to a malicious page of memory, the hypervisor could cause the guest operating system to execute undesired and possibly malicious program code. The described embodiments therefore perform operations for ensuring that information in the nested page table has not been unexpectedly or impermissibly changed by the hypervisor. For these operations, the described embodiments use a reverse map table (RMT) to ensure that, among other things, the hypervisor (and/or another entity) has not remapped translations from guest physical addresses to system physical addresses in the nested page table. The reverse map table is a record in memory that includes information that can be used to determine, among other things, which entity owns a page of memory (e.g., a guest operating system to which the page of memory is assigned or the hypervisor), and whether a system physical address acquired during a table walk of the nested page table for a guest physical address is assigned to that guest physical address. In other words, the reverse map table can be used to ensure that a system physical address for a given page in memory is matched to only one guest physical address at a time, which prevents the erroneous or malicious remapping of such addresses. An example of a reverse map table is shown in FIG. 6.

Migrating Pages of Memory

In the described embodiments, pages of memory can be migrated within a memory. For migration, a page of memory is physically moved within the memory so that the page is relocated from a first location in memory to a second location in the memory. For example, if the page of memory is an 8 KiB page of memory and is initially located at addresses A through A+8 KiB−1, the page can be migrated to addresses B though B+8 KiB−1. In some embodiments, pages of memory can be migrated in order to relocate pages of memory to locations in memory that are better suited for the pages of memory and/or the memory itself. For example, often-accessed or higher priority pages of memory may be migrated from a first type of memory with slower access speed to a second type of memory with faster access speed or vice versa. As another example, a page of memory may be migrated within the memory to avoid wear on memory circuitry in the memory. As yet another example, a page of memory may be migrated in the memory to locate the page of memory closer to other pages of memory that are being accessed. As yet another example, in some embodiments, the memory is configured for non-uniform memory access (NUMA), with each of a number of portions of the memory being located closely to respective processing nodes, and a page of memory can be migrated between the portions of the memory in the nodes.

In some embodiments, the decision to migrate a page of memory is made by a software entity and/or a functional block or device in an electronic device based on one or more migration rules (i.e., guidelines, standards, thresholds, etc.) that identify conditions under which pages of memory are to be migrated. For example, an operating system or hypervisor executed by a processor in the electronic device can determine that a page of memory is to be migrated based on the frequency or type of accesses being made of the page of memory. As another example, a memory management unit functional block in a processor can determine that a page of memory is to be migrated from a slower access memory to a faster access memory based on a priority identified in memory access requests for the page of memory.

Although a processor is capable of migrating pages of memory in the memory, i.e., of physically moving the individual bytes of the page of memory in the memory, using the processor to perform migrations can consume processor resources that are better used for other operations (e.g., computational operations, other types of memory accesses, etc.). In some embodiments, therefore, the migration of pages of memory is offloaded from the processor to a page migration engine functional block or device. The page migration engine, given an identification of a page of memory and a destination location in memory, can perform—and may be optimized to perform—the migration of the page of memory. In some embodiments, the page migration engine includes a direct memory access (DMA) functional block that performs operations for physically moving pages of memory within the memory.

Overview

In the described embodiments, an electronic device includes a processor and one or more input-output (IO) devices (where IO devices can include functional blocks or actual devices within and/or connected to the electronic device such as network interfaces, disk controllers, graphics processing units, etc.). The electronic device also includes a memory that is used for storing data for use by the processor and/or the IO devices. The electronic device further includes at least one page migration engine functional block that performs operations for copying, moving, and otherwise handling data stored in the memory. As part of these operations, the page migration engine performs operations associated with migrating pages of memory (e.g., 4 KiB pages of memory), which involves relocating the pages of memory within the memory in accordance with migration rules. The electronic device also includes an input-output memory management unit (IOMMU) that manages memory accesses by the IO devices. In the described embodiments, the IOMMU performs operations for controlling IO device accesses of pages of memory that are to be or are being migrated and controlling the use of information from IO page table entries for such pages of memory. The operations performed by the IOMMU are directed at ensuring that IO devices—and, more generally, the electronic device—do not experience errors or failures that might occur if the IO devices accessed a page of memory that was being migrated (i.e., encountered a missing page of memory) and/or used incorrect information from an IO page table entry for such a page of memory.

In the described embodiments, two different records are used by the IOMMU for controlling accesses by IO devices to pages of memory that are being prepared for migration or are being migrated. The records include the IO page table and a reverse map table (RMT), each of which includes respective information that is used for determining whether pages of memory are being migrated—and thus whether the pages of memory and/or the respective IO page table entries can be accessed. The information in the IO page table includes migration information in the IO page table entries. In other words, the IO page table entries include, along with the above-described translation information and metadata, migration state information. The migration state information includes an indication of whether preparations are being made for migrating the page of memory associated with the page table entry or the page of memory is being migrated (or not). For example, in some embodiments, the migration state information includes two bits, with each possible combination of the two bits identifying a corresponding migration state from among a set of migration states. In the first, or "non-migration," migration state, identified by 00, the page of memory is not being migrated. In the second and third migration states, identified by 01 and 10, respectively, respective preparations are being made for migrating the page of memory. In the fourth migration state, identified by 11, final preparations are being made for migrating the page of memory or the page of memory is in the process of being migrated (i.e., is actually being relocated in the memory). The information in the RMT includes migration information and lock indicators in RMT entries. In other words, the RMT entries include, along with information for determining whether nested page table entries have been remapped, RMT migration state information and lock indicators. Similarly to the migration state information in the page table entries in the IO page table, the RMT migration state information includes an indication of whether preparations are being made for migrating the page of memory associated with the page table entry or the page of memory is being migrated (or not). The lock indicator includes an indication of whether the respective RMT entry is locked.

In some embodiments, the processor executes a software entity that, in combination with the page migration engine, performs at least some of the operations for preparing pages of memory for migration and handling the migration of the pages of memory. For example, the software entity can be or include a hypervisor, an operating system, an application program, etc. Among the operations performed by the software entity and/or the page migration engine for preparing for migrating pages of memory is setting the migration state information for the pages of memory in the IO page table and/or information in the RMT entries involved with the migration of the page of memory. For example, as functional blocks and devices in the electronic device proceed through each of the above-described migration states, the software entity or the page migration engine can set the migration state information and/or the information in the RMT entries accordingly. Another operation performed by the software entity and/or the page migration engine is invalidating existing copies of information from IO page table entries for migrating pages stored in caches in the IOMMU or the IO devices. A further operation performed by the page migration engine is, after migrating pages of memory, updating IO page table entries for the pages of memory to identify the new locations in the memory for the pages of memory and setting the migration state information in the IO page table entries and the information in the RMT entries to indicate the non-migration migration state.

In some embodiments, the IOMMU enforces access restrictions for the page of memory and the IO page table entry based on the migration state information in the IO page table entry and/or the information in the RMT entries. For example, when the migration state information in the IO page table entry and/or the information in the RMT entry for a source page of memory indicate that preparations are being made for migrating the page of memory or the page of memory is being migrated, the IOMMU can prevent the IOMMU itself and the IO devices from storing or using copies of information from the IO page table entry in local caches. As another example, when the migration information in the IO page table entry and/or the information in the RMT entry for the source page of memory indicate that the page of memory is being prepared for migration or is being migrated, the IOMMU can ensure that IO device accesses of the page of memory are handled accordingly. That is, the IOMMU can ensure that existing memory accesses of the page of memory are completed before the page of memory is migrated and newly encountered memory accesses of the page of memory are stalled (i.e., held, buffered, etc.) until after the page of memory is migrated. In contrast, when the migration information in the JO page table entry and/or the information in the RMT entry for the source page of memory indicate that the page of memory is in the non-migration migration state (and thus is not being migrated), the IOMMU can allow normal accesses of the page of memory and the JO page table entry.

In some embodiments, some or all of the JO devices support an address translation service (ATS) such as the PCI Express (PCIe) Address Translation Service, which is a standard under which JO devices can request, from the IOMMU, information from JO page table entries to be locally cached in entries in local caches, or "address translation caches (ATCs)," in the JO devices. As part of the above-described operations for preventing the storage of copies of information from an JO page table entry in caches in the JO devices, the IOMMU can reject/deny ATS requests for information from IO page table entries associated with pages of memory that are to be or are being migrated.

For the above-described operations, an IOMMU uses information in an IO page table and the RMT to handle memory accesses and IO page table accesses by IO devices for migrating pages of memory. Memory accesses by other functional blocks and devices in the electronic device for migrating pages of memory, however, can be handled differently. For example, when preparing 10 device accessible pages of memory for migration, the pages of memory can simply be marked as missing in the nested page table (and the corresponding information invalidated in TLBs in processors). Because processors (unlike certain JO devices) include mechanisms for handling missing pages, the processors will proceed with handling the missing pages normally—and will then continue memory accesses after the pages of memory are migrated and the nested page table is updated accordingly. In addition, pages of memory that are not being prepared for migration or being migrated and their respective page table entries, even when accessible to IO devices, can be accessed normally—although in consideration of memory access ordering rules, etc.

In some embodiments, when migrating pages of memory that are not IO device accessible, but instead are only processor accessible, some or all of the above-described mechanisms can be used, albeit adjusted for operations with a processor accessible page. For example, in some embodiments, a software entity or page migration engine can mark the page of memory as "not present" in the nested page table (and invalidate the corresponding in TLBs in processors). As with the preceding case, processors will handle the missing pages of memory using page faulting mechanisms. In addition, or alternatively, the software entity and/or page migration engine can lock an RMT entry for a migrating processor only page of memory and an accessing processor can use RMT checking/verification mechanism to avoid accessing the migrating page of memory.

By handling the migration of pages of memory that are accessible to IO devices, the described embodiments enable such pages of memory to be more freely migrated within the memory despite the presence of IO devices that may not themselves properly handle migrating pages of memory. Migrating these pages of memory can help to ensure that the pages of memory are in desirable locations in the memory. This can improve the operation of the memory, which in turn improves the operation of the processor and the IO devices that use the pages of memory in the memory.

Electronic Device

FIG. 1 presents a block diagram illustrating an electronic device 100 in accordance with some embodiments. As can be seen in FIG. 1, electronic device 100 includes processor 102, memory 104, mass storage 106, input-output (IO) devices 108-110, input-output (IO) hub 112, and page migration engine 114. Processor 102, memory 104, mass storage 106, IO devices 108-110, 10 hub 112, and page migration engine 114 are all implemented in "hardware," i.e., using corresponding integrated circuitry, discrete circuitry, and/or devices. For example, in some embodiments, processor 102, memory 104, mass storage 106, IO devices 108-110, 10 hub 112, and page migration engine 114 are implemented in integrated circuitry on one or more semiconductor chips, are implemented in a combination of integrated circuitry on one or more semiconductor chips in combination with discrete circuitry and/or devices, or are implemented in discrete circuitry and/or devices. In FIG. 1, electronic device 100 is partially shaded to enable the various figure elements to be more easily distinguished.

Processor 102 is a functional block that performs computational, memory access, control, and/or other operations in electronic device 100. Processor 102 includes cores 116-118, each of which includes one or more central processing unit (CPU) cores, graphics processing unit (GPU) cores, embedded processors, application specific integrated circuits (ASICs), and/or other computational functional blocks.

Processor 102 includes cache memories, or "caches," which are functional blocks that are used for storing copies of data that can be used by cores 116-118 for performing various operations. As can be seen in FIG. 1, the caches in processor 102 include level-one (L1) caches 120-122 (L1 120 and L1 122) in cores 116-118, respectively. Each of L1 caches 120-122 includes memory circuitry for storing data and control circuitry for handling accesses of data stored in the memory circuitry. Processor 102 also includes shared level-two (L2) cache 124 and level three (L3) cache 126 that each include memory circuitry for storing data and control circuitry for handling accesses of data stored in the memory circuitry.

Processor 102 includes platform security processor (PSP) 128, which is a functional block that is used for performing security-related operations in electronic device 100. For example, in some embodiments, PSP 128 includes a CPU core, an ASIC, and/or a microcontroller. PSP 128 includes circuitry that is designed to be secure against specified malicious or erroneous behaviors of other functional blocks and devices in processor 102 and/or software entities executed by processor 102. PSP 128 can therefore be used for securing the operations of other functional blocks, devices, and/or software entities that are susceptible to such behavior. In other words, PSP 128 can perform operations associated with enabling a trusted execution environment in electronic device 100. To this end, PSP 128 may perform operations for encryption/decryption (e.g., key generation, encryption/decryption of data, etc.), registration and/or authentication of hardware and/or software entities, access permission verification, etc. In some embodiments, PSP 128 performs at least some of the operations described herein for handling the migration of pages that are accessible to IO devices 108-110. For example, a software entity may communicate a request to migrate a page of memory to PSP 128, which then verifies that the migration of the page of memory is permitted (i.e., that the software entity is allowed to move the particular page of memory to a destination location in the memory, etc.) before forwarding the request to migrate the page of memory to page migration engine 114 for subsequent processing.

Memory 104 is a functional block that is used for storing data for other functional blocks in electronic device 100. For example, in some embodiments, memory 104 is a "main" memory in electronic device 100. Memory 104 includes memory circuitry for storing data and control circuitry for handling accesses of data stored in the memory circuitry.

In some embodiments, memory 104 includes two or more different types of memory that are arranged so that different portions of a set of addressable locations in memory 104 are in each of the types of memory. For example, in some embodiments, half of the addressable locations are in a first type of memory, and thus are implemented using a first type of memory circuitry, and half of the addressable locations are in a second type of memory, and thus are implemented using a second type of memory circuitry. The use of two types of memory is illustrated in FIG. 1 via type of memory 130 and type of memory 132. For example, type of memory 130 can be fifth generation double data rate synchronous dynamic random access memory (DDR5 DRAM) or another type of memory and type of memory 132 can be 3D crosspoint (3D XPoint) memory or another type of memory. Each type of memory has respective memory characteristics. For example, the memory characteristics can include some or all of access speed/latency, access bandwidth, data protection/verification/error correction, reliability/mean time between failures, electrical power consumption, heat generation, data addressability (e.g., byte or block addressability), data compatibility/specification, monetary cost, design complexity, etc.

Mass storage 106 is a functional block and/or device that stores data for use by other functional blocks and devices in electronic device 100. For example, mass storage 106 can be or include a semiconductor memory, a disk drive, an optical drive, etc. Mass storage 106 includes circuitry and/or devices that retain stored data despite electrical power for mass storage 106 being shut off (or otherwise reduced) and thus serves as non-volatile "long term" storage for data. At runtime (i.e., as electronic device 100 operates), copies of data are acquired from mass storage 106 and stored in volatile memory 104 (and possibly one or more caches) for subsequent accesses by functional blocks in electronic device 100. For example, data may be acquired/read from mass storage 106 in blocks or pages a given size (e.g., 4 KiB, 2 MiB, 1 GiB, etc.) and the pages, or "pages of memory," stored in memory 104. In addition, pages of memory that are created by other functional blocks and devices in electronic device 100 may stored in memory 104 (e.g., for storing computational results, files, configuration values, etc.) and eventually written out to mass storage 106. While stored in memory 104, pages of memory can be accessible to the other functional blocks and devices in accordance with access rules and permissions for the pages of memory and/or the data therein.

Returning to processor 102, memory management unit (MMU) 134 is a functional block that handles memory access requests and requests for information from page tables. When data is to be accessed by a functional block in processor 102, the functional block sends a memory access request to MMU 134. For example, a software entity (e.g., a program, an operating system, etc.) being executed by core 116 may cause a load/store unit in processing circuitry in core 116 to send a memory access request (e.g., for a load or store of data, etc.) to MMU 134. MMU 134 then sends a corresponding memory access request to one or more of L2 cache 124, L3 cache 126, and memory 104 for satisfaction or resolution of the memory access request. For example, if data is to be loaded, MMU 134 may acquire the data from L2 cache 124, L3 cache 126, or memory 104 and forward the data to the requesting functional block. This may mean loading one or more pages of memory that include the data from mass storage 106 to memory 104, should the data not already be present in memory 104.

MMU 134 includes table walker (TW) 136, which is a functional block that performs operations relating to acquiring address translation information and other information from page tables via page table walks. As described in more detail above, in some embodiments, electronic device 100 uses virtual memory to enable software entities (e.g., executed by cores 116-118) to access memory using virtual addresses that are translated into physical addresses. Upon receiving a memory access request from a software entity with a virtual address, table walker 136 performs page table walk operations for translating the virtual address into the physical address for the pages where data is located in memory 104. During page table walk operations, table walker 136 may also check page table entries and/or other records to ensure that the functional block and/or software entity that is requesting each memory access is permitted to perform such an access, i.e., is allowed to access the memory at the physical address, etc. and that the page table and other records used for the translation have not been tampered with or impermissibly modified. In some embodiments, table walker 136 also checks migration state information in page table entries as part of the operations described herein for handling the migration of pages.

In some embodiments, table walker 136 uses two separate page tables for performing address translations. In some of these embodiments, the two page tables include a guest page table 148 and nested page table 150. Guest page table 148 and nested page table 150 are each a record that includes entries, or "page table entries," for storing address translation information and other information for respective pages of memory in memory 104. For example, guest page table 148 can include page table entries with information for pages of memory presently in memory 104 that have been accessed by a corresponding guest operating system. In some embodiments, guest page table 148 includes guest virtual address to guest physical address translation information for pages of memory as well as respective other information (i.e., metadata, etc.). As another example, nested page table 150 can include page table entries with information for pages of memory presently in memory 104 that have been accessed by a guest operating system and/or another software entity or functional block. Nested page table 150 (interchangeably called system page table, host page table, etc.) includes guest physical address to system physical address translation information for pages of memory as well as respective other information (i.e., metadata, etc.). In some embodiments, among the other information that is stored in page table entries in nested page table 150 is migration state information that is used for handling the migration of pages of memory as described herein.

Although only one guest page table 148 is shown in FIG. 1 as an example, in some embodiments, electronic device 100 includes a separate guest page table for each guest operating system (there may be multiple guest operating systems), with address translations used by/for that guest operating system. In addition, although guest page table 148 and nested page table 150 are shown in different types of memory, there is no requirement that guest page table 148 and nested page table 150 be stored in particular types of memory—guest page table 148 and nested page table 150 can be stored anywhere in memory 104. Also, although shown as a single entity in FIG. 1, in some embodiments, guest page table 148 and/or nested page table 150 are or include multiple separate page sub-tables that are used in combination for performing virtual address to physical address translations. For example, in some embodiments, one or both of guest page table 148 and nested page table 150 are hierarchical page tables that include two or more layers or levels of sub-tables (and may include multiple sub-tables at each layer), with each sub-table except a final sub-table indicating a next sub-table in the hierarchy to be searched for address translation information and the final table including the address translation information. In these embodiments, performing a table walk involves traversing each sub-table to get to the final sub-table where the address translation information is stored.

MMU 134 includes translation lookaside buffer (TLB) 138, which is a functional block that is used for storing copies of information acquired from page table entries (e.g., from guest page table 148 and/or nested page table 150). TLB 138 includes memory circuitry for a cache that stores copies of page table entries or portions thereof acquired during page table walks by table walker 136 (or from other sources). In order to avoid performing page table walks, when possible, MMU 134 acquires address translation information and/or other page table entry information from TLB 138. If address translation information and/or other page table entry information is not present in TLB 138, however, table walker 136 performs a table walk in guest page table 148 and/or nested page table 150 to acquire the information. In some embodiments, specified information in TLB 138 is invalidated before corresponding pages are migrated as described herein.

Input-output (IO) devices 108-110 are functional blocks or devices that interact with processor 102 and other functional blocks and devices in electronic device 100. Processor 102 and the other functional blocks can therefore receive "input" data from or send "output" data to IO devices 108-110. IO devices 108-110 may also interact with functional blocks or devices external to electronic device 100. For example, input-output devices 108-110 can include network interface devices, disk controllers, devices coupled to corresponding wired or wireless buses or interfaces (e.g., a Peripheral Controller Interface Express (PCIe) bus, a Universal Serial Bus (USB), a WiFi network, etc.), graphics processing units, etc. The particular operations performed by each of IO devices 108-110 depends on the nature of each IO device. For example, if IO device 108 is a disk controller, IO device 108 may retrieve data from a disk (e.g., mass storage 106) and write data into memory 104 or vice versa. As another example, if IO device 110 is a network interface device, IO device 110 may store data received via a network (not shown) in memory 104, acquire data from memory 104 to be transmitted to a receiving device over the network, provide data to or acquire data from processor 102, etc.

IO hub 112 is a functional block or device that performs operations for interfacing between IO devices 108-110 and other functional blocks in electronic device 100. In other words, IO hub 112 performs operations for routing communications and other data between IO devices 108-110 and functional blocks such as processor 102, memory 104, etc. The particular communications that are routed by IO hub 112 and the operations that are performed for routing the communications depend on the nature of IO devices 108-110, but can include memory accesses, data communications, control and configuration communications, etc.

IO hub 112 includes input-output memory management unit (IOMMU) 140, which is a functional block that performs operations for handling memory accesses by IO devices 108-110. When data in memory 104 is to be accessed by an IO device, an IO device transmits a corresponding memory access request. IOMMU 140 intercepts the memory access request from the IO device, processes the request internally to determine whether the memory access request can proceed, and then (assuming that the memory access request can proceed) sends a corresponding request to memory 104 to access the data.

Among the operations performed by IOMMU 140 for processing memory access requests from IO devices 108-110 is performing address translations for memory accesses for IO devices 108-110 (i.e., for acquiring physical addresses in memory associated with virtual addresses used by IO devices 108-110 in memory access requests). IOMMU 140 includes input-output table walker (IOTW) 142, which a functional block that performs operations relating to acquiring address translations from page tables (e.g., page table walks, etc.). The operations performed by input-output (IO) table walker 142 are similar to those performed by table walker 136, albeit for memory accesses from IO devices 108-110 (rather than processor 102). In some embodiments, along with performing address translations, IO table walker 142 also checks metadata and page information such as migration state information to determine whether memory accesses from IO devices 108-110 are permitted in pages of memory and/or whether the page of memory is being migrated as described herein. In these embodiments, IO table walker 142 can block or otherwise handle memory accesses to avoid improper memory accesses or memory accesses to pages that are being migrated.

In some embodiments, IOMMU 140 uses an IOMMU-specific page table, IO page table 152, for performing address translations. IO page table 152 is a record that includes entries, or "page table entries," for storing address translation information and other information for respective pages of memory in memory 104. For example, IO page table 152 can include page table entries with information for pages of memory presently in memory 104 that have been accessed by IO devices or IOMMU 140 itself. IO page table 152 includes guest physical address to system physical address translation information for pages of memory as well as respective other information (i.e., metadata, etc.). (In some embodiments, IOMMU 140 acquires address information from guest operating systems that own pages of memory and thus the contents of IO page table 152 include guest physical addresses.) In some embodiments, among the other information that is stored in page table entries in IO page table 152 is migration state information that is used for handling the migration of pages of memory as described herein. Similarly to guest page table 148 and nested page table 150, although shown as a single entity in FIG. 1, IO page table 152 may include a hierarchy of separate sub-tables.

IOMMU 140 also includes translation lookaside buffer (TLB) 144, which is a functional block that is used for storing copies of information acquired from page table entries in IO page table 152 (or elsewhere). TLB 144 includes memory circuitry for a cache that stores copies of page table entries or portions thereof acquired during page table walks by table walker 10 table walker 142 (or from other sources). In order to avoid performing page table walks, when possible, IOMMU 140 acquires address translation information and/or other page table entry information from TLB 144. If address translation information and/or other page table entry information is not present in TLB 144, however, IO table walker 142 performs a table walk to acquire the information. In some embodiments, specified information in TLB 144 is invalidated before corresponding pages are migrated as described herein.

In some embodiments, some or all of IO devices 108-110 include local caches for storing copies of information acquired from page table entries. For example, in some embodiments, some or all of IO devices 108-110 and IOMMU 140 provide support for the peripheral component express (PCIe) address translation service (ATS), under which IOMMU 140 can provide copies of information acquired from page table entries in IO page table 152 to IO devices 108-110 for caching therein. An example of such a cache is shown as address translation cache (ATC) 146 in IO device 108. ATC 146 includes memory circuitry for a cache that stores copies of page table entries or portions thereof acquired during page table walks by IO table walker 142 (or from other sources). In order to avoid performing page table walks, when possible, IO device 108 acquires address translation information and/or other page table entry information from ATC 146. If address translation information and/or other page table entry information is not present in ATC 146, however, IO table walker 142 performs a table walk to acquire the information (or uses cached information from TLB 144). In some embodiments, specified information in ATC 146 is invalidated before corresponding pages are migrated as described herein.

In some embodiments, although shown as a single entity in FIG. 1, IOMMU 140 includes multiple separate IOMMUs (e.g., multiple instances of an IOMMU functional block). For example, in some embodiments, electronic device 100 includes at least two IOMMU functional blocks, each IOMMU functional block controlling memory accesses by a subset of a set of IO devices in electronic device 100. In these embodiments, the IOMMUs work together, or through a "master" IOMMU or other functional block, to ensure that the IOMMUs are using information in a page table and accessing memory for IO devices properly—including in the presence of migrating pages of memory as described herein. For example, IOMMUs can broadcast, on a communication link to which all IOMMUs are connected, requests and acknowledgements of TLB invalidations, memory access completions or halts, etc. to ensure that all of the IOMMUs are synchronized before a given IOMMU performs an operation such as accessing information in a page table entry, allowing a memory access from an IO device to proceed, etc. In some of these embodiments, all IOMMUs use a single shared page table (e.g., IO page table 152), while in other embodiments, each IOMMU uses a separate page table.

In some embodiments, electronic device 100 includes reverse map table (RMT) 154 in memory 104. Reverse map table 154 is a record that is used (e.g., by table walker 136 and IO table walker 142) to detect when changes are made to nested page table 150 and otherwise protect pages of memory from impermissible accesses by guest operating systems, a hypervisor, and/or IO devices. Reverse map table 154 includes a number of entries, one entry for each page of memory in memory 104 that may be allocated for the use of one or more virtual machines. For example, if a memory 104 includes 32 GiB of memory that may be allocated in 4 KiB pages to virtual machines, reverse map table includes 8,388,608 entries. The entries in reverse map table 154 can store information such as identifiers of guest physical addresses that are associated with system physical addresses, of the permissions levels for accessing virtual machines, identifiers for owners of pages of memory, and/or other information associated with corresponding pages. An example of a reverse map table is shown in FIG. 6 and described in more detail below. In some embodiments, when performing table walks, table walker 136 and/or IO table walker 142 check a corresponding entry in reverse map table 154 to ensure that information in nested page table 150 is safe to use (i.e., has not been unexpectedly changed by the hypervisor) and that given memory accesses can be performed on the respective page of memory.

Page migration engine 114 is a functional block that performs operations associated with accessing data in memory 104. Page migration engine 114 can be used for offloading memory access operations from other functional blocks in electronic device 100. For example, in some embodiments, page migration engine 114 offloads, and thus receives and performs, memory accesses on behalf of cores 116-118, which enables cores 116-118 to avoid themselves performing memory access operations. In some embodiments, page migration engine 114 includes, among other functional blocks, one or more direct memory access (DMA) functional blocks that perform operations for moving pages of memory within memory 104. Among the memory access operations performed by page migration engine 114 is migrating pages of memory in memory 104. For migrating pages of memory, upon receiving a request from one of cores 116-118 (e.g., from an operating system being executed by core 116, etc.) or from another source, such as PSP 128, that identifies a page of memory and a new location in memory where the page of memory is to be stored, page migration engine 114 moves the page of memory to the new location (i.e., physically moves the individual bits/bytes in the page of memory to the new location in one or more data movement operations). Along with migrating pages of memory, page migration engine 114 performs operations for handling the migration of pages of memory that are accessible to IO devices, e.g., updating IO page table 152 and reverse map table 154, etc., as described herein.

In some embodiments, although shown as a single entity in FIG. 1, page migration engine 114 includes multiple separate page migration engines (e.g., multiple instances of a page migration engine functional block). For example, in some embodiments, page migration engine 114 includes at least two page migration engines, each page migration engine arranged to perform memory accesses on behalf of other functional blocks in electronic device 100—including migrating pages of memory as described herein. In these embodiments, page migration tasks/requests are distributed among the two or more page migration engines in accordance with a distribution scheme (e.g., round robin, by memory address or location in memory, etc.) and the page migration engines may coordinate accesses to avoid specified memory accesses, etc.

In some embodiments, communication paths are coupled between the functional blocks in electronic device 100 as shown by arrow-headed lines between the functional blocks. Communication paths include one or more busses, wires, guides, and/or other connections possibly along with controllers, fabric elements (e.g., switches, routers, etc.), etc. The communication paths are used to route commands, data, control signals, and/or other information between functional blocks. For example, in some embodiments, an interconnect fabric is coupled between IO hub 112, processor 102 (e.g., MMU 134), IOMMU 140, and memory 104. Note that some communication paths are not shown in FIG. 1 for clarity.

Although electronic device 100 is shown in FIG. 1 with a particular number and arrangement of functional blocks and devices, in some embodiments, electronic device 100 includes different numbers and/or arrangements of functional blocks and devices. For example, in some embodiments, processor 102 includes a different number of cores. As another example, in some embodiments, a different number and/or arrangement of caches is present in processor 102. As yet another example, in some embodiments, IO device 108 does not include an address translation cache—or both IO devices 108-110 include translation caches. As yet another example, although shown as being included in electronic device 100, in some embodiments, one or both of IO devices 108-110 are external IO devices such as IO devices coupled to electronic device 100 via a network, a wired or wireless connection, etc. Generally, in the described embodiments, electronic device 100 includes sufficient numbers and/or arrangements of functional blocks to perform the operations herein described.

Electronic device 100 and processor 102 as shown in FIG. 1 are simplified for illustrative purposes. In some embodiments, however, electronic device 100 and/or processor 102 include additional or different elements and mechanisms for performing the operations herein described and other operations. For example, electronic device 100 and/or processor 102 may include power functional blocks or devices, human interface functional blocks or devices, etc.

In some embodiments, functional blocks shown separately in FIG. 1 are implemented together. For example, in some embodiments, some or all of IO hub 112 and IO devices 108-110 are incorporated in/with processor 102, such as being fabricated on the same integrated circuit chip. In other words, for such embodiments, IO hub 112 and IO devices 108-110 may be integrated with processor 102 (e.g., as a "system on a chip" or in another form). Alternatively, in some embodiments, functional blocks that are shown as part of other functional blocks may be separate. For example, in some embodiments, PSP 128 is implemented separately from processor 102.

Electronic device 100 can be, or can be included in, any electronic device that performs computational operations. For example, electronic device 100 can be, or can be included in, desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

Operating System

Figure 2:
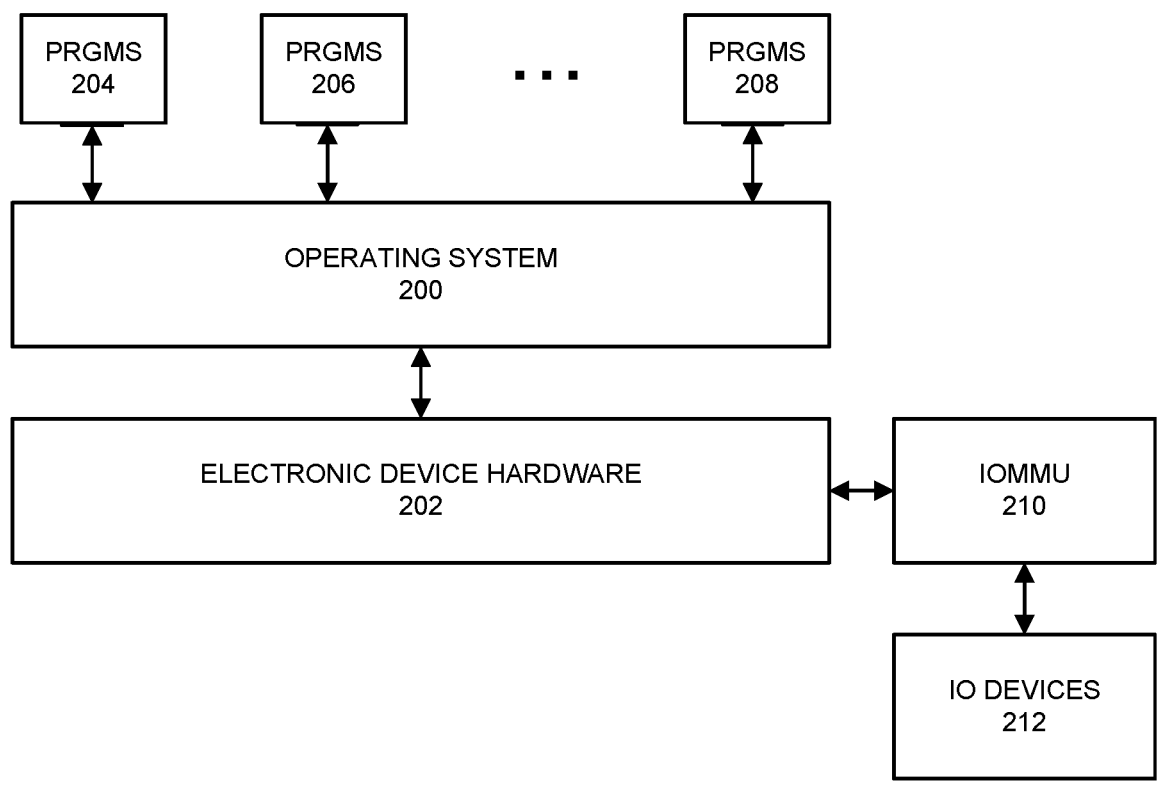
FIG. 2 presents a block diagram illustrating an operating system and functional blocks and devices in an electronic device in accordance with some embodiments.

In some embodiments, a processor in an electronic device executes a number of software entities that cause the processor to perform various operations. For example, in some embodiments, the software entities include an operating system. FIG. 2 presents a block diagram illustrating an operating system and functional blocks and devices in an electronic device in accordance with some embodiments. Note that FIG. 2 is simplified and generally shows the relationship of an operating system with electronic device hardware. In some embodiments, some or all of the elements shown in FIG. 2 are not present and/or are arranged differently.

As can be seen in FIG. 2, operating system 200 interfaces between electronic device hardware 202 (i.e., between the functional blocks and devices of electronic device 100 such as processor 102, etc.) and a set of programs 204-208. For example, operating system 200 may be Windows® from Microsoft of Redmond, Wash., macOS® from Apple, Inc. of Cupertino, Calif., etc. and programs 204-208 may each be a productivity application, a scientific computing application, a web browser, etc. IOMMU 210 interfaces between IO devices 212 and electronic device hardware 202 (e.g., memory 104, etc.). In some embodiments, the functional blocks and devices in FIG. 2, i.e., electronic device hardware 202, IOMMU 210, and IO devices 212, are similar to hardware in electronic device 100 (e.g., processor 102, memory 104, page migration engine 114, etc.), IOMMU 140, and IO devices 108-110, respectively, as shown in FIG. 1.

Virtual Machines and Hypervisor

FIG. 3 presents a block diagram illustrating a hypervisor and functional blocks and devices in an electronic device in accordance with some embodiments. As can be seen in FIG.

3, there are three virtual machines (VM) 300-304, on each of which executes a respective guest operating system (GUEST OS) 306-310 and one or more programs (PROGRMS) 312-316. Hypervisor 318 interfaces between a host operating system 320 and virtual machines 300-304. Host operating system 320 interfaces between electronic device hardware 322 and hypervisor 318. IOMMU 324 interfaces between IO devices 326 and electronic device hardware 322. In some embodiments, the functional blocks and devices in FIG. 3, i.e., electronic device hardware 322, IOMMU 324, and IO devices 326, are similar to hardware in electronic device 100 (e.g., processor 102, memory 104, page migration engine 114, etc.), IOMMU 140, and IO devices 108-110, respectively, as shown in FIG. 1.

FIG. 3 is simplified and generally shows the relationship of a hypervisor with electronic device hardware. In some embodiments, however, some or all of the elements shown in FIG. 3 are not present and/or are arranged differently. For example, in some embodiments, rather than communicating with electronic device hardware 322 via host operating system 320, hypervisor 318 communicates more directly with electronic device hardware 322.

Page Table Entries

Figure 4:
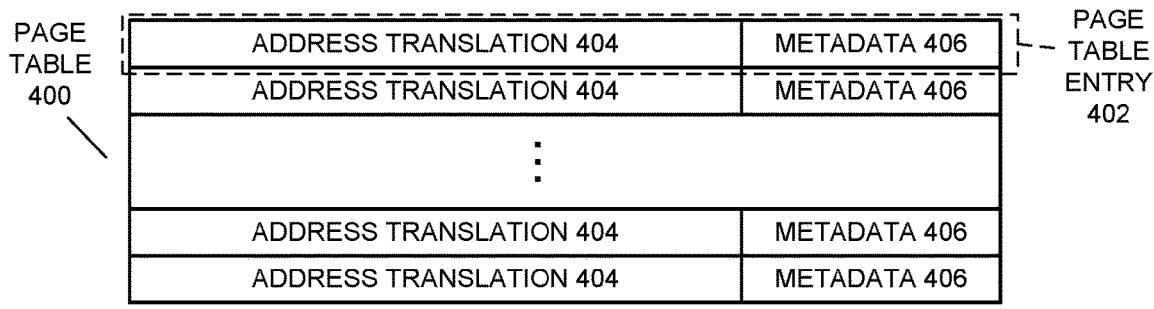
FIG. 4 presents a block diagram illustrating a page table in accordance with some embodiments.

As described above, in some embodiments, functional blocks and devices in an electronic device (e.g., processor 102, IOMMU 140, etc.) use one or more page tables (e.g., guest page table 148, nested page table 150, and/or IO page table 152) for performing address translations and for other operations. FIG. 4 presents a block diagram illustrating a page table 400 in accordance with some embodiments. Page table 400 as shown in FIG. 4 is presented as a generic example of a page table. In some embodiments, some or all of nested page table 150 and IO page table 152 are internally arranged (i.e., include similar information to) page table 400. In some embodiments, guest page table 148 is also similarly arranged, although possibly without migration state information in metadata in page table entries.

As can be seen in FIG. 4, page table 400 includes a number of page table entries 402 (one of which is highlighted using a dashed line), each of which can store an address translation 404 along with corresponding metadata 406. As pages of memory (i.e., blocks of data of a specified size, such as 4 KiB, 2 MiB, etc.) are retrieved from mass storage (e.g., mass storage 106) and stored in a memory (e.g., memory 104) or newly created in the memory, corresponding page table entries 402 are added to page table 400 with address translations 404 and metadata 406. Thus, if a page of memory is available in memory 104 and has been accessed by a software entity, functional block, or device associated with page table 400, page table 400 should include a corresponding page table entry 402. Recall that page table entries 402 are added to page table 400 to enable keeping track of mappings between the addresses used by accessing entities (e.g., software entities, functional blocks, and devices) and the addresses where data is located in memory.

In some embodiments, the address translation 404 in each page table entry 402 includes information that can be used for determining a physical address associated with a respective page of memory. In other words, each address translation 404 includes information that can be used to identify a location in memory 104 for a page of memory for an accessing software entity, functional block, or device. For example, in some embodiments, address translation 404 includes virtual address to physical address translation information—such as guest virtual address to guest physical address translation information. As another example, in some embodiments, address translation 404 includes physical address to physical address translation information—such as guest physical address to system physical address translation information. In some embodiments, each address translation 404 includes a first field with some or all of one or more virtual or physical addresses (e.g., N of M bits of each address, where N<=M) and a second field with some or all of a physical address to which the one or more virtual or physical addresses map/match.

Figure 5:
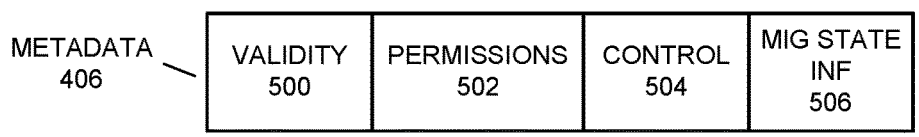
FIG. 5 presents a block diagram illustrating metadata in a page table entry in accordance with some embodiments.

Metadata 406 includes information associated with, characterizing, controlling, and/or otherwise relevant to the corresponding address translation 404. As translation information for a page of memory is added to a page table entry 402 in page table 400, metadata is acquired, generated, etc. and added to that page table entry 402. FIG. 5 presents a block diagram illustrating metadata 406 for a page table entry in accordance with some embodiments. As can be seen in FIG. 5, metadata 406 includes validity 500, permissions 502, control 504, and migration state information (MIG STATE INF) 506. Validity 500 includes one or more values that relate to the validity of the page table page table entry 402, the address translation 404 in that page table page table entry 402, and/or the corresponding page of memory in memory 104. For example, validity 500 may include one or more bits indicating whether the page table entry 402 is itself valid/accessible and/or whether the corresponding page in memory 104 is valid/accessible.

Permissions 502 includes one or more values that relate to access permissions for the corresponding page in memory 104. For example, permissions 502 may include one or more bits that indicate whether the corresponding page in memory 104 has read-only or read-write permissions set, whether the page is only accessible with particular privileges (administrator, user, kernel, etc.), and/or other permissions information.

Control 504 includes one or more values that relate to the use of the page table entry 402 and/or the corresponding page in memory 104. For example, control 504 may include a page size indicator, a dirty indicator (for when the corresponding page in memory 104 has been modified and is therefore inconsistent with the associated block of memory in mass storage 106), an accessed indicator (for when the page in memory 104 has been accessed one or more times), a write-through indicator (for when modifications to the page in memory 104 are to be reflected immediately in the associated block of memory on mass storage 106), and/or other values.

Migration state information 506 includes one or more values that indicate whether (or not) preparations are being made for migrating the associated page or the associated page is being migrated. For example, in some embodiments, migration state information includes a number of bits sufficient to uniquely identify each possible migration state for a corresponding page of memory. For instance, if there are six migration states, with a first migration state being for a non-migration state for pages that are not being migrated, a sixth migration state being for pages that are being migrated, and the four intermediary migration states being for various preparation operations for preparing to migrate pages of memory, the migration state information can be stored in three bits. A functional block or device that accesses a page table entry can use migration state information 506 to decide what operations are permitted (or not) for the page of memory and/or the information in the corresponding page table page table entry 402. For example, in some embodiments, when the migration state indicates that preparations are being made for migrating the page of memory or the page of memory is being migrated, an accessing functional block or device can determine that copies of information from the page table entry are not permitted to be cached in local caches and/or that some or all memory accesses to the page of memory are restricted (e.g., are to be stalled until after the page is migrated, etc.).

In some embodiments, one or both of address translation 404 and metadata 406 may be modified/changed, updated, etc. after being added to page table 400. For example, when a page is moved from a first location to a second location in memory 104, an address translation 404 in the corresponding page table entry 402 can be updated. As another example, in an embodiment where metadata 406 includes permissions 502 (e.g., read/write permissions), permissions 502 can be updated to indicate the read only, read-write, etc. permissions for the corresponding page in memory 104. As yet another example, migration state information 506 can be updated as functional blocks and devices proceed through migration states for migrating a page of memory.

As described above, when attempting to acquire address information or metadata, MMU 134 (e.g., table walker 136), IOMMU 140 (e.g., IO table walker 142), or another entity in electronic device 100 can perform a page table walk. During the page table walk, MMU 134, IOMMU 140, etc., search page table 400 to find an page table entry 402, should such an page table entry 402 exist, in which a corresponding address translation 404 is held. Upon encountering such an page table entry 402, MMU 134, IOMMU 140, etc. acquire, from the page table entry 402, the address. For example, MMU 134 can acquire a system physical address associated with a guest physical address, IOMMU 140 can acquire a system physical address associated with a guest physical address, etc. If the MMU 134, IOMMU 140, etc. is unable to find a corresponding page table entry 402, an error-handling operation is performed (e.g., a page fault is emitted and subsequently processed, etc.).

In the described embodiments, functional blocks and devices in the electronic device (e.g., an IOMMU, a page migration engine, etc.) use information in page table 400 for performing operations for preventing IO devices from encountering issues with missing or unavailable page table entries—or the corresponding pages of memory—due to the migration of the corresponding pages of memory. For example, in some embodiments, when determining an address translation for a memory access request, IO table walker 142 checks the migration state information 506 in the respective page table entry 402 to determine if the address translation 404 is allowed to be cached by IOMMU 140 and/or IO devices 108-110 and/or if the memory access is to be stalled due to the present migration state.

Although page table 400 is shown with a particular number of page table entries 402, some embodiments include a different number of page table entries 402 (as shown by the ellipsis in FIG. 4). In addition, although page table entry 402 and metadata 406 are shown with particular arrangements and types of information, in some embodiments, one or both of page table entry 402 and metadata 406 include different information. For example, in some embodiments, at least some of the above-described metadata is stored in a location other than in a page table entry 402. For instance, in some embodiments, a separate in-memory data structure is used for storing the migration state information. Generally, page table 400 includes sufficient information to enable functional blocks and devices in an electronic device to store and retrieve address translation information and metadata as described herein.

Although page table 400 is shown as a single table, in some embodiments, page table 400 is organized differently. For example, in some embodiments, page table 400 is implemented using two or more sub-tables arranged in a hierarchy. In these embodiments, a search of each sub-table directs a searching functional block or device to a next sub-table in the hierarchy until a final sub-table is reached in which the address translation 404 and metadata 406 are stored in a corresponding page table entry 402.

Reverse Map Table Entries

As described above, in some embodiments, functional blocks and devices in an electronic device (e.g., MMU 134, IOMMU 140, etc.) use a reverse map table for verifying the correctness of entries in page table(s) and for other operations. FIG. 6 presents a block diagram illustrating a reverse map table 600 in accordance with some embodiments. Although reverse map table 600 is shown in FIG. 6 as including particular information, in some embodiments, a different arrangement or type of information may be present. Generally, reverse map table 600 includes sufficient information to perform the operations herein described. Note that, in some embodiments, reverse map table 154 is internally arranged (i.e., includes similar information to) reverse map table 600.

In the following paragraphs, reverse map table 600 is described in sufficient detail to understand the operations using a reverse map table in this description. Certain details of the reverse map table and operations for maintaining and using the reverse map table, however, are left out for clarity and brevity. A more detailed description of a reverse map table and some examples of operations on and using the reverse map table can be found in U.S. Pat. No. 10,509,736, which issued on 17 Dec. 2019, and which is incorporated by reference herein.

As can be seen in FIG. 6, reverse map table 600 includes a number of entries 602 (an entry 602 is highlighted using a dashed line in FIG. 6). Each entry 602 includes information about a corresponding page in memory—and, in some embodiments, each allocatable page in memory will have a respective reverse map table entry. In some embodiments, the entries in reverse map table 600 are indexed using system physical addresses associated with each page of memory, so that each entry 602 is associated with a separate system physical address. For example, a first entry in reverse map table 600 may be associated with a page of memory at a lowest system physical address (e.g., address A in an address space of the memory), a second entry in reverse map table 600 may be associated with a page of memory at a second lowest system physical address (e.g., address A+4 KiB−1, for 4 KiB pages of memory), and so forth.

In reverse map table 600, each entry 602 can be used for storing guest identifier (ID) 604, guest physical address (PHY ADDR) 606, page information (INFO) 608, assigned indicator (ASSIGNED) 610, lock indicator (LOCK) 612, migration state information (MIG STATE INF) 614, and other information (OTHER) 616 for a respective page of memory. Guest identifier 604 is an identifier associated with a guest operating system to which the corresponding page of memory is allocated. When the corresponding page of memory is allocated for the use of a particular guest operating system, therefore, an identifier for the particular guest operating system is recorded in guest identifier 604. For example, guest identifier 604 may hold an address space identifier (ASID), an ID string, a name, and/or another value that identifies a guest operating system. For pages of memory that are not assigned to a particular guest operating system, guest identifier 604 may identify the page as being allocated to a hypervisor, shared among multiple guest operating systems, or otherwise allocated.

Guest physical address 606 is a value that represents a guest physical address that is associated with the system physical address for the entry 602. For example, when a page at a given system physical address is allocated for the use of a guest operating system, assigned to the guest operating system, etc., the guest physical address to be used by the guest operating system for addressing the page is recorded in the corresponding entry 602 in reverse map table 600. In this way, a record is made of the particular guest physical address to be used by the guest operating system for which each page is allocated. This information enables a table walker (e.g., table walker 136 or IO table walker 142) to determine, for checking a system physical address acquired during a walk of a nested page table or an IO page table, whether the system physical address maps to the expected guest physical address. This can enable detecting whether the mapping has been changed maliciously or erroneously by a hypervisor or another entity.

Page information 608 includes information about the page of memory, such as a sub-page count for the page of memory (e.g., a number of 4 KiB pages within a 2 MiB page, etc.) and/or a size of the page of memory (e.g., in bytes). Page information 608 can be used to determine whether memory accesses to pages of memory are directed to appropriately sized pages of memory (i.e., that a memory access of a 2 MiB page is not addressing a 4 KiB page, etc.).

Assigned indicator 610 is an indicator of whether the entry 602 is currently assigned to one or more guest operating systems. Assigned indicator 610 is used to prevent the use of information from entries 602 in reverse map table 600 that are not presently allocated, but may contain information, that are initialized, but do not contain actual information, etc. In some embodiments, assigned indicator 610 is set when a page is currently allocated to one or more guest operating systems and is unset/cleared when the page is deallocated from all guest operating systems.

Lock indicator 612 is an indicator of whether the entry 602 is locked. When lock indicator 612 is set, entry 602 is considered to be locked, and when lock indicator 612 is unset/cleared, entry 602 is considered to be free or available. Once an entry 602 has been locked by a given software entity, functional block, or device in electronic device 100, other software entities, functional blocks, and devices are prevented from accessing the entry 602 (e.g., reading, writing/updating, etc. the entry 602). In contrast, software entities, functional blocks, or devices can be permitted to access an available (i.e., not locked) entry 602 (possibly after themselves setting lock indicator 612). For example, in an embodiment where lock indicator 612 is a single bit and is initially clear (e.g., set to zero), an entity may set lock indicator 612 (e.g., to 1), access entry 602 one or more times, and then clear lock indicator 612 when finished accessing the entry 602. Using lock indicator 612, the described embodiments can avoid race conditions and other conditions where simultaneous reads and/or writes may occur for the entry 602. In addition, using lock indicator 612 in combination with other information, software entities, functional blocks, and/or devices can prevent specified accesses of migrating pages of memory and/or the respective page table entries.

Migration state information 614 includes one or more values that indicate whether (or not) preparations are being made for migrating the associated page of memory or the associated page of memory is being migrated. For example, in some embodiments, migration state information 614 includes a number of bits sufficient to identify each migration state of a set of migration states for a corresponding page of memory. For instance, continuing the six migration state example from above, the migration state information can be stored in three bits. A functional block or device that accesses the entry 602 can use migration state information 614 to decide what operations are permitted (or not) for the page of memory and/or the information in the corresponding page table entry. For example, in some embodiments, when migration state information 614 indicates that preparations are being made for migrating the page of memory or the page of memory is being migrated, an accessing functional block or device can determine that copies of information from the page table entry are not permitted to be cached in local caches and/or that some or all of memory accesses to the page of memory are restricted (e.g., are to be stalled until after the page is migrated, etc.). In some embodiments, the information kept in migration state information 614 can be organized differently and/or include different values than the migration information in migration state information 506. Some examples of the different information kept in migration state information 614 and migration state information 506 are presented below for FIG. 7.

Other information 616 includes information for and/or about the page of memory, the guest operating system(s) to which the page is allocated, entry 602 itself, and/or other information that is useful for controlling access to entry 602 and/or the page of memory. For example, in some embodiments, other information 616 includes a validated indicator, which is an indicator of whether entry 602 has been validated by a guest operating system (i.e., a guest operating system to which the corresponding page of memory is allocated). As another example, in some embodiments, other information 616 includes a permissions level block with sets of permissions the corresponding page of memory. As yet another example, in some embodiments, other information 616 includes a shared pages indicator, which is an indicator of whether the corresponding page is shared by two or more guest operating systems. The validated indicator, permissions level block, shared pages indicator, and/or other metadata (e.g., an immutable indicator, etc.) that may be included in other information 616 is described in more detail in U.S. Pat. No. 10,509,736, which, as described above, is incorporated by reference herein.

Migration States

In some embodiments, as preparations are made for migrating pages of memory and the pages of memory are then migrated, software entities, functional blocks, and/or devices in an electronic device (e.g., IOMMU 140, page migration engine 114, processor 102, operating system 200, and/or hypervisor 318) proceed through migration states from among a set of migration states. Aside from an initial non-migrating migration state, in each of the migration states, respective operations are performed for preparing to migrate pages of memory and/or for migrating the pages of memory. Requests for memory accesses of pages of memory that are to be or are being migrated and/or of information in the respective page table entries are handled by functional blocks and devices in the electronic device (e.g., IOMMU 140, page migration engine 114, etc.) based on the current migration state of the pages of memory. Generally, the access requests are handled in such a way that software entities, functional blocks, and/or devices continue to operate correctly while the operations of each migration state are performed. For example, IO devices (e.g., IO devices 108-110) and/or a processor (e.g., processor 102) are protected from errors and faults that could arise from accesses of the migrating pages of memory and/or the respective page table entries.

Figure 7:
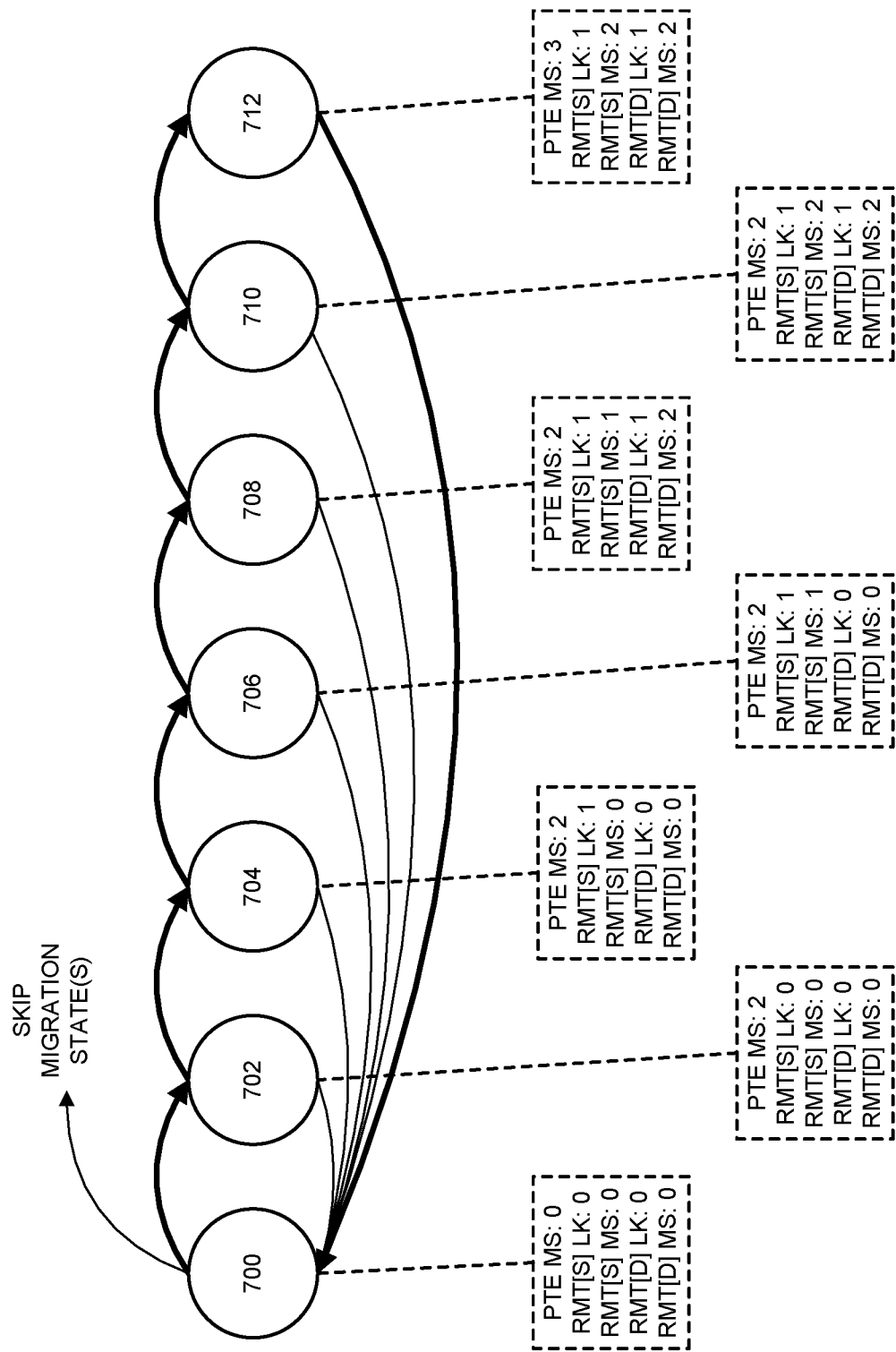
FIG. 7 presents a state diagram illustrating migration states in accordance with some embodiments.

FIG. 7 presents a state diagram illustrating migration states in accordance with some embodiments. The migration states shown in FIG. 7 are an example of migration states through which software entities, functional blocks, and/or devices in an electronic device proceed as preparations are made for migrating pages of memory and the pages of memory are then migrated. Although a particular number and arrangement of migration states and transitions between the migration states are shown in FIG. 7, in some embodiments, different numbers and/or arrangements of migration states can be used and/or different transitions between the migration states can be used. For example, a number of the migration states in FIG. 7 include two or more operations (e.g., migration state 708, in which both a lock indicator and migration state information are set in a reverse map table entry) that may otherwise be associated with separate migration states.

In FIG. 7, transitions between migration states are shown using arrow-headed lines between migration states. A first set of transitions between the migration states is shown using thicker lines, while other transitions between the migration states are shown using thinner lines. In the following description, the first set of transitions between the migration states is described and then the other transitions between the migration states are described. Note, however, that the use of different line thicknesses is merely for clarity in describing the migration states and the transitions between the migration states.

As can be seen in FIG. 7, the migration states include migration states (MS) 700-712. In migration state 700, which is a "non-migrating" migration state, a page of memory is not being migrated and thus will remain in a current location in memory. Migration state 700 is therefore the migration state in which the page of memory is maintained until the page of memory is to be migrated (and, more generally, pages of memory are kept until the pages of memory are to be migrated). In migration state 700, migration state information in page table entries in the IO page table for the page of memory (e.g., migration state information 506) are set to respective bit sequences, values, etc. that represent or identify the page of memory as being in migration state 700. For example, assuming that the migration state information in the IO page table includes two bits, migration state information in the IO page table entry for the page of memory can be set to 00 to represent or identify migration state 700. In FIG. 7, the migration state information for the IO page table entry is shown as PTE MS: 0 in the callout for migration state 700 (the respective callout for each of migration states 700-712 is shown using dashed lines).

In some embodiments, a nested page table (e.g., nested page table 150) includes migration state information in page table entries. In these embodiments, similarly to how the migration state information is set in the IO page table, migration state information is set in nested page table entries to identify the present migration states for respective pages of memory. For clarity and brevity, however, the setting of migration state information in nested page table entries is not described for FIG. 7. All references to "page table entry," in the following description of FIG. 7 therefore refer to IO page table entries unless otherwise identified. Note that, in some embodiments, the IO page table and the nested page table are combined, so that all of the information described herein as being found in the IO page table is instead found in the nested page table—and the electronic device may not include a separate IO page table. In these embodiments, the operations described herein involving the IO page table instead involve the nested page table.

In migration state 700, RMT migration state information (e.g., migration state information 614) in a reverse map table (RMT) entry for each of a source page of memory and a destination page of memory is set to a bit sequence, value, etc. that represents or identifies the page of memory as being in migration state 700. For example, assuming that the RMT migration state information includes two bits, the RMT migration state information in each of the RMT entries can be set to 00 to represent or identify migration state 700. As used herein, "source page of memory" and "destination page of memory" are the locations in memory where the page of memory to be migrated is currently located and where the page of memory is to be relocated during the migration, respectively. Recalling that the reverse map table includes an RMT entry for each page of memory (i.e., associated with each location/physical address where a page of memory can be stored), therefore, the RMT migration state information is found in the reverse map table entries associated with the locations in memory where the page of memory to be migrated is currently located (source page of memory) and where the page of memory is to be relocated (destination page of memory). In FIG. 7, the RMT migration state information in the RMT entries for the source page of memory, RMT[S], and the destination page of memory, RMT[D], are shown in the callout for migration state 700 as RMT[S] MS: 0 and RMT[D] MS: 0, respectively.

Along with the RMT migration state information, in migration state 700, the lock indicator in the RMT entry for each of the source page of memory and the destination page of memory (e.g., lock indicator 612) is cleared (i.e., unset, deasserted, etc.). This indicates that the RMT entries for each of the source page of memory and the destination page of memory are currently unlocked—and can therefore be accessed normally (i.e., without restrictions due to the migration of the page of memory). In FIG. 7, the lock indicator in the RMT entries for the source page of memory and the destination page of memory are shown in the callout for migration state 700 as RMT[S] LK: 0 and RMT[D] LK: 0, respectively.

In migration state 700, because the migration state information in the page table entry and the RMT migration state information in the RMT entry identify the page of memory as being in migration state 700, the IOMMU allows accesses of the page of memory and the respective information in the page table entry from the IO devices to proceed normally. That is, because preparations for migrating the page of memory are not being made and the page of memory is not being migrated, accesses of the page of memory and the information in the page table entry are not prevented, stalled, or otherwise restricted by the IOMMU. In migration state 700, therefore, the IOMMU uses information from the page table entry normally and performs memory accesses of the page of memory normally.

In some embodiments, although accesses of the page of memory and the respective page table entry are not restricted due to the migration of the page of memory in migration state 700, other restrictions relating to accesses of the page of memory and the information in the page table entry can still be enforced by the IOMMU. For example, if a page of memory is not accessible to an IO device due to the page of memory being a private page of memory that is not ordinarily accessible to the IO device, being in migration state 700 does not change such an access restriction.

From migration state 700, the functional blocks, devices, and software entities proceed to migration state 702 (as shown via the thick arrow-headed line between migration states 700 and 702). For example, upon encountering a request to migrate the page of memory (e.g., forwarded from a platform security processor (e.g., PSP 128)) or otherwise determining that the page of memory is to be migrated, a software entity (e.g., a hypervisor, an operating system, etc.) notifies the page migration engine to commence operations for migrating the page of memory, i.e., to proceed to migration state 702. When entering migration state 702, the page migration engine sets migration state information in the page table entry for the page of memory to a bit sequence, value, etc. that represents or identifies migration state 702. For example, assuming that the migration state information includes two bits, the page migration engine can set the migration state information to 10 to represent or identify migration state 702. In FIG. 7, the migration state information for the page table entry is shown as PTE MS: 2 in the callout for migration state 702.

Note that, in the embodiment shown in FIG. 7, migration state information 1 is not used in the migration states page table entry, and thus PTE MS: 1 is not shown in a migration state in FIG. 7. In this embodiment, the migration state information value 1 is reserved for a use that is not described for FIG. 7. More specifically, in the embodiment shown in FIG. 7, the IOMMU and IO devices operate in a secure ATS mode in which the IOMMU provides IO devices with guest physical addresses in response to ATS requests—and therefore does not provide the IO devices with system physical addresses. In the secure ATS mode, the IOMMU provides only guest physical addresses because guest physical addresses in memory access requests are translated into system physical addresses by the IOMMU, which provides the IOMMU with an opportunity to check information in the page table entry and/or the RMT for the memory access request. That is, the IOMMU can check the migration state for each page of memory and memory accesses can be handled as described for FIG. 7. In contrast, in some embodiments, in (non-secure) ATS mode, when the IO devices are provided with system physical addresses and may therefore access memory without the IOMMU performing the above-described checks, the software entity can set the migration state information to 1 for the page of memory to inform the IOMMU (and other entities) that the software entity is to commence operations for migrating of the page of memory. In these embodiments, the software entity may also invalidate the system physical addresses held by IO devices in ATCs to avoid accesses of pages of memory that are being prepared for migration and/or are being migrated.

There is no change in the RMT migration state information or the lock indicators in the RMT entries for the source page of memory or the destination page of memory between migration state 700 and migration state 702. This is because the RMT migration state information and the lock indicators are not yet changed in migration state 702—and will be changed in a subsequent migration state as preparations continue to be made for migrating the page of memory. In FIG. 7, the RMT migration state information in the RMT entries for the source page of memory and the destination page of memory are shown in the callout for migration state 702 as RMT[S] MS: 0 and RMT[D] MS: 0, respectively. In addition, in FIG. 7, the lock indicator in the RMT entries for the source page of memory and the destination page of memory are shown in the callout for migration state 702 as RMT[S] LK: 0 and RMT[D] LK: 0, respectively. Note that, because the lock indicator in the RMT entry for each of the source page of memory and the destination page of memory remains cleared, the RMT entries for each of the source page and the destination page remain unlocked—and can therefore still be accessed normally.

In migration state 702, initial preparations are made for migrating the page of memory in the memory. The preparations include the IOMMU preventing the caching (i.e., storage) of new copies of information from the page table entry for the page of memory in local caches in the IOMMU and/or the IO devices (e.g., TLB 144, ATC 146, etc.). Because the subsequent migration of the page of memory will render copies of information from the page table entries incorrect due to the page of memory being located at a new physical address in memory, copies of the information from the page table entry are prevented from being stored in the local caches in the IOMMU or the IO devices until the page of memory has been migrated and the page table entry updated. In migration state 702, therefore, because the migration state information in the page table entry and RMT migration state information and the lock indicator in the RMT entry for the source page of memory identify the page of memory as being in migration state 702, the IOMMU will not acquire copies of information from the page table entry in order to cache such copies in the local cache in the IOMMU itself and/or for providing such copies to IO devices for storage in local caches in the IO devices. In other words, upon encountering the combination of PTE MS: 2, RMT[S] LK: 0, and RMT[S] MS: 0 during a page table walk and reverse map table check for a memory access request for the page of memory, the IOMMU will determine that the page of memory is in migration state 702 and restrict the use of copies of information from the page table entry as described.

In some embodiments, for "not providing" copies of information from the page table entry to IO devices as described above, the IOMMU denies ATS requests from IO devices for copies of information from the page table entry. For example, in some embodiments, the IOMMU can respond to ATS requests by informing the requesting IO device that the page of memory is not present, which causes the IO device to proceed with operations for making the page present.

In migration state 702, and in contrast to certain subsequent migration states, the IOMMU allows memory accesses other than newly encountered memory accesses for which RMT checks are not performed to proceed. For example, the IOMMU can allow memory accesses, both existing and newly encountered, for which RMT checks are performed to proceed. Because the RMT entry for the source page of memory is not yet marked as locked in migration state 702, memory accesses for which RMT checks are performed will proceed normally. In other words, upon encountering the combination of PTE MS: 2, RMT[S] LK: 0, and RMT[S] MS: 0 during a page table walk and reverse map table check for a memory access request for the page of memory, the IOMMU will determine that the page of memory is in migration state 702 and allow newly encountered memory accesses to proceed. Allowing such memory accesses to proceed clears up/completes memory accesses of the page of memory in preparation for migrating the page of memory (as the page of memory should not be migrated with memory accesses outstanding) without unnecessarily delaying operations of the IO devices.

In migration state 702, and in contrast to the other types of memory accesses described above, the IOMMU stalls newly encountered memory accesses from the IO devices to the page of memory for which RMT checks are not performed. In migration state 702, therefore, because the migration state information in the page table entry and the RMT entry for the source page identifies the page of memory as being in migration state 702, the IOMMU stalls newly encountered memory accesses for which RMT checks are not performed until after the migration of the page of memory is completed (e.g., until a return to migration state 700). For example, the IOMMU may hold newly encountered memory accesses for which RMT checks are not performed in a buffer, memory element, etc. (e.g., by storing information for a memory access request from an IO device), and subsequently release the held memory accesses from the buffer, memory element, etc. after the migration of the page of memory is completed.

In some embodiments, in preparation for entering migration state 702 and/or when entering migration state 702, the software entity and/or page migration engine updates the nested page table (i.e., a page table used by cores 116-118, but not by IO devices) to identify the page of memory as being not present. For example, in some embodiments, the software entity can change validity information (e.g., validity 500) in a respective nested page table entry and/or other information in the nested page table entry to identify the page of memory as missing. Because the nested page table is set in this way, cores 116-118 (and/or other software entities, functional blocks, etc. that use the nested page table) view the page as "missing," i.e., as not yet having been loaded from mass storage 106 or otherwise not present in the memory, and will not make memory accesses of the page of memory. Instead, cores 116-118 will handle the missing page of memory using well-known page faulting mechanisms. In these embodiments, the eventual "load" of the page of memory for the page faulting mechanisms is actually the relocation of the page of memory during the migration. In some embodiments, therefore, the resolutions of such page faults are stalled until the page of memory has been migrated.

From migration state 702, the functional blocks, devices, and software entities proceed to migration state 704 (as shown via the thick arrow-headed line between migration states 702 and 704). In other words, after performing the operations of migration state 702, the page migration engine can transition to migration state 704. Because migration state 704 uses the same migration state information as migration state 702, when entering migration state 704, the page migration engine leaves the migration state information in the page table entry for the page of memory set to the same bit sequence, value, etc. In FIG. 7, the migration state information for the page table entry is shown as PTE MS: 2 in the callout for migration state 704. In addition, in migration state 704, the RMT migration state information in the RMT entry for each of the source page of memory and the destination page of memory are unchanged from migration state 702. In FIG. 7, the RMT migration state information in the RMT entries for the source page of memory and the destination page of memory are shown in the callout for migration state 704 as RMT[S] MS: 0 and RMT[D] MS: 0, respectively. The lock indicator in the RMT entry for the destination page of memory is additionally unchanged from migration state 702 in migration state 704. In FIG. 7, the lock indicator in the RMT entry for the destination page of memory is shown in the callout for migration state 704 as RMT[D] LK: 0. This indicates that the RMT entry for the destination page remains unlocked—and can therefore still be accessed normally.

In migration state 704, in preparing for the migration of the page of memory, the page migration engine locks the RMT entry for the source page of memory. Locking the RMT entry for the source page of memory prevents accesses of the RMT entry itself and/or the source page of memory (for accesses that perform RMT checks). In some embodiments, for locking the RMT entry for the source page of memory, the page migration engine performs a compare and swap (CAS) to update the lock indicator from 0 (cleared/unlocked) to 1 (set/locked). In FIG. 7, the lock indicator in the RMT entry for the source page of memory is shown in the callout for migration state 704 as RMT[S] LK: 1.

In some embodiments, in migration state 704, i.e., when the RMT[S] LK: 1 and RMT[S] MS: 0, because the RMT entry is shown as locked and there is no indication as yet in the RMT entry that the page of memory is being migrated, the IOMMU will stall all memory access requests to the source page of memory. In other words, upon encountering the combination of PTE MS: 2, RMT[S] LK: 1, and RMT[S] MS: 0 during a page table walk and reverse map table check for a memory access request for the source page of memory in migration state 704, the IOMMU stall all newly encountered memory accesses of the source page of memory. In addition, certain accessing entities (e.g., cores 116-118), upon finding the RMT entry for the source page of memory locked during an RMT check before accessing the source page of memory, will fault (e.g., page fault, etc.) or otherwise handle the locked RMT entry—and will not access the source page of memory.

In migration state 704, because the migration state information in the page table entry and the RMT entry for the source page identifies the page of memory as being in migration state 704, the IOMMU continues preventing the caching (i.e., storage) of new copies of information from the page table entry for the page of memory in local caches in the IOMMU and/or the IO devices. That is, as with migration state 702, the IOMMU does not allow copies of information from the page table entry to be cached as described above.

From migration state 704, the functional blocks, devices, and software entities proceed to migration state 706 (as shown via the thick arrow-headed line between migration states 704 and 706). Because there is no change for the migration state information in the page table entry in between migration state 704 and migration state 706, the migration state information in the page table entry is unchanged. In FIG. 7, the migration state information for the page table entry is shown as PTE MS: 2 in the callout for migration state 706. In migration state 706, the lock indicator in the RMT entry for the source page is also not changed from migration state 704, which is shown in the callout for migration state 706 in FIG. 7 as RMT[S] LK: 1. In addition, the lock indicator and RMT migration state information in the RMT entry for the destination page are unchanged, and are shown in FIG. 7 as RMT[D] MS: 0 and RMT[D] LK: 0 in the callout for migration state 706.

In migration state 706, the page migration engine sets the RMT migration state information in the RMT entry for the source page to identify the source page as being in migration state 706. For example, in some embodiments, the page migration engine can perform a compare and swap (CAS) to update the RMT migration state information in the RMT entry for the source page of memory from 0 to 1. In FIG. 7, the RMT migration state information in the RMT entry for the source page of memory is shown in the callout for migration state 706 as RMT[S] MS: 1.

Because the migration state information in the page table entry and the RMT entry for the source page identifies the page of memory as being in migration state 706, the IOMMU stalls all newly encountered memory accesses of a first type until after the migration of the page of memory is completed (e.g., until a return to migration state 700). For example, in some embodiments, the first type of memory accesses includes memory accesses such as reads, compare and swaps, etc. that cause a response (e.g., returned data, etc.) from the memory to a requesting IO device—in contrast to a second type of memory accesses such as writes, invalidations, etc. that do not cause a response. The IOMMU may hold all newly encountered memory accesses of the first type in a buffer, memory element, etc. and subsequently release the held memory accesses after the migration of the page of memory is completed. In other words, upon encountering the combination of PTE MS: 2, RMT[S] LK: 1, and RMT[S] MS: 1 during a page table walk and reverse map table check for a memory access request for the page of memory, the IOMMU will determine that the page of memory is in migration state 706 and stall all memory accesses of the first type to the page of memory. In migration state 706, however, the IOMMU allows memory accesses other than newly encountered memory accesses of the first type to proceed. For example, the IOMMU can allow existing memory accesses of the first type to proceed. In addition, the IOMMU can allow both existing and newly encountered memory accesses of the second type to proceed. This can include releasing memory accesses that were stalled in migration state 704 as described above. In some embodiments, newly encountered memory accesses of the first type are stalled separately from newly encountered memory accesses of the second type (which are stalled in migration states 710-712, as described below) to avoid conflicts that may occur between memory accesses of the first and second types, deadlock conditions, and/or other problems as memory accesses are completed in preparation for migrating the page of memory.

In migration state 706, because the migration state information in the page table entry and the RMT entry for the source page identifies the page of memory as being in migration state 706, the IOMMU continues preventing the caching (i.e., storage) of new copies of information from the page table entry for the page of memory in local caches in the IOMMU and/or the IO devices. That is, as with migration states 702-704, the IOMMU does not allow copies of information from the page table entry to be cached as described above.

From migration state 706, the functional blocks, devices, and software entities proceed to migration state 708 (as shown via the thick arrow-headed line between migration states 706 and 708). Because there is no change for the migration state information in the page table entry in between migration state 706 and migration state 708, the migration state information in the page table entry is unchanged. In FIG. 7, the migration state information for the page table entry is shown as PTE MS: 2 in the callout for migration state 708.

In migration state 708, the page migration engine prepares the RMT entry for the destination page of memory for the migration of the page of memory. For this operation, the page migration engine first locks the RMT entry for the destination page of memory in order to prevent accesses of the RMT entry itself and/or the destination page of memory. For example, in some embodiments, the page migration engine can perform a compare and swap (CAS) to update the lock indicator in the RMT entry for the destination page of memory from 0 (cleared/unlocked) to 1 (set/locked). In FIG. 7, the lock indicator in the RMT entries for the destination page of memory is shown in the callout for migration state 708 as RMT[D] LK: 1.

After locking the RMT entry for the destination page of memory, the page migration engine partially overwrites the RMT entry for the destination page of memory with a copy of information from the RMT entry for the source page of memory. For example, in some embodiments, the page migration engine saves a copy of the information from the RMT entry for the source page of memory that is returned in response to the above-described CAS operations (i.e., for setting the locked indicator and the RMT migration state information in migration state 706). The page migration engine then overwrites the RMT entry for the destination page of memory with the saved copy of the information from the RMT entry for the source page of memory. For example, in some embodiments, the page migration engine copies information such as a guest ID (e.g., guest ID 604), guest physical address (e.g., guest physical address 606), page information (e.g., page information 608), etc. from the RMT entry for the source page of memory to the RMT entry for the destination page of memory. The page migration engine then removes (e.g., deletes, overwrites, sets to default values, etc.) the information from the RMT entry for the source page. By overwriting the RMT entry with the information from the RMT entry for the destination page and removing the information from the RMT entry for the source page, the page migration engine transfers the information from the RMT entry for the source page to the RMT entry for the destination page. The transfer switches the ownership, access controls, and other records from the source page of memory to the destination page of memory—and removes the ownership, access controls, and other records from the source page of memory (so that two pages of memory are not impermissibly referred to by the source and destination RMT entries).

During the above-described overwriting operation for the RMT entry for the destination page, the page migration engine does not copy the RMT migration state information from the RMT entry for the source page of memory to the RMT entry for the destination page of memory. Instead, the page migration engine sets the RMT migration state information in the RMT entry for the destination page of memory to identify the destination page of memory as being in migration state 708. For example, in some embodiments, the page migration engine can set the RMT migration state information in the RMT entry for the destination page of memory to 2. In FIG. 7, the RMT migration state information in the RMT entry for the destination page of memory is shown in the callout for migration state 708 as RMT[D] MS: 2. When set to 2, the RMT migration state information, along with the lock indicator being set, causes the IOMMU to handle memory access from IO devices as described above.

In migration state 708, the page migration engine invalidates any existing copy of the information from the page table entry in the local cache in the IOMMU and in TLBs in cores 116-118 (recall that existing copies of the information from the page table entry in local caches in the IO devices were previously invalidated in migration state 702). For example, the page migration engine may issue an invalidation request to the IOMMU that causes the IOMMU to invalidate any existing copy of the information from the page table entry in the local cache. In addition, the page migration engine similarly invalidates any existing copy of the information from the RMT entries from the source page of memory and the destination page of memory in the local cache in the IOMMU and in TLBs in cores 116-118. In migration state 708, the IOMMU also continues to prevent the IOMMU and/or IO devices from storing copies of information from the page table entry for the page of memory in local caches as described above for migration states 702-706.

From migration state 708, the functional blocks, devices, and software entities proceed to migration state 710 (as shown via the thick arrow-headed line between migration states 708 and 710). Because there is no change for the migration state information in the page table entry in between migration state 708 and migration state 710, the migration state information in the page table entry is unchanged. In FIG. 7, the migration state information for the page table entry is shown as PTE MS: 2 in the callout for migration state 710.

In migration state 710, the page migration engine finishes preparing the RMT entry for the source page of memory for the migration of the page of memory. For this operation, the page migration engine sets the RMT migration state information in the RMT entry for the source page to identify the source page as being in migration state 710. For example, in some embodiments, the page migration engine can set the RMT migration state information in the RMT entry for the source page of memory to 2. In FIG. 7, the RMT migration state information in the RMT entry for the source page of memory is shown in the callout for migration state 710 as RMT[S] MS: 2. When set to 2, the RMT migration state information causes software entities and functional blocks such as cores 116-118 to prevent accesses to the source page of memory.

Because the migration state information in the page table entry and the RMT entry for the source page identifies the page of memory as being in migration state 710, the IOMMU stalls newly encountered memory accesses of both the first type and the second type until after the migration of the page of memory is completed (e.g., until a return to migration state 700). For example, the IOMMU may hold all newly encountered memory accesses of the first type and the second type in a buffer, memory element, etc. and subsequently release the held memory accesses after the migration of the page of memory is completed. In other words, upon encountering the combination of PTE MS: 2, RMT[S] LK: 1, and RMT[S] MS: 2 during a page table walk and reverse map table check for a memory access request for the page of memory, the IOMMU will determine that the page of memory is in migration state 710 and stall memory accesses of both the first type and the second type to the page of memory. In migration state 710, however, the IOMMU allows memory accesses other than newly encountered memory accesses to proceed. For example, the IOMMU can allow existing memory accesses of the first type and the second type to proceed. In migration state 710, the IOMMU also continues to prevent the IOMMU and/or IO devices from storing copies of information from the page table entry for the page of memory in local caches as described above for migration states 702-708.

From migration state 710, the functional blocks, devices, and software entities proceed to migration state 712 (as shown via the thick arrow-headed line between migration states 710 and 712). When entering migration state 712, the page migration engine sets the migration state information in the page table entry for the page of memory to a bit sequence, value, etc. that represents or identifies migration state 712. For example, assuming that the migration state information includes two bits, migration state information can be set to 11 to represent or identify migration state 712.

In migration state 712, the page migration engine leaves the RMT migration state information and the lock indicators in the RMT entries for the source page of memory and the destination page of memory unchanged, as these values are the same between migration states 710 and 712. In FIG. 7, therefore, the migration state information for the page table entry is shown as PTE MS: 3, and the RMT migration state information and the lock indicator in the RMT entries for the source page of memory and the destination page of memory are shown as RMT[S] LK: 1, RMT[S] MS: 2, RMT[D] LK: 1, and RMT[D] MS: 2 in the callout for migration state 712.

In migration state 712, preparations for migrating the page of memory in the memory are completed and then the page of memory is migrated. For these operations, because the page table entry and the RMT migration state information in the RMT entries for the source page of memory and the destination page of memory indicate that the page of memory is in migration state 712, the IOMMU continues to stall memory accesses of both the first type and the second type to the page of memory. The IOMMU also continues to prevent the IOMMU and/or IO devices from storing copies of information from the page table entry for the page of memory in local caches as described above for migration states 702-710. The IOMMU further completes all existing/outstanding memory accesses to the page of memory. In other words, all remaining memory accesses that were in progress before the entry into migration state 712 are completed. All the existing/outstanding memory accesses are completed so that no memory accesses of the page of memory access the page of memory during migration (i.e., because outdated/incorrect data could be accessed, etc.).

After the existing/outstanding memory accesses are completed, and thus all remaining accesses to the page of memory are stalled in preparation for migrating the pages of memory, the preparations for migrating the page of memory are finished. The page migration engine therefore migrates the page of memory in the memory. For example, the page migration engine can move the page of memory from a first/source location/physical address in the memory to a second/destination location/physical address in the memory (e.g., a location specified in the request to migrate the page of memory). In some embodiments, the movement in the memory is from a first type of memory (e.g., a slower access type of memory) to a second type of memory (e.g., a faster access type of memory) or vice versa. Although migration state 712 is shown as a single migration state, in another example, migration state could be split into migration state 712A, in which the existing/outstanding memory accesses are completed, and 712B, in which the page of memory is migrated/moved in memory and the cleanup operations (as described below) are performed in preparation for returning the page of memory to migration state 700.

After migrating the page of memory, the page migration engine updates (or causes another functional block or software entity to update) the page table entry to identify the system physical address where the page of memory is stored (i.e., the physical address of the second location in the memory). In other words, the page migration engine updates the address translation information for the page of memory so that a guest physical address used by IO devices in the electronic device can be correctly mapped to the system physical address where the page of memory is stored. The page migration engine also sets any associated metadata in the page table entry (if necessary) based on the second location in the memory.

Because the page of memory has been migrated successfully, the functional blocks, devices, and software entities return to migration state 700 (as shown via the thick arrowheaded line between migration states 712 and 700). As part of returning to migration state 700, the page migration engine sets the migration state information in the page table entry for the page of memory to a bit sequence, value, etc. that represents or identifies migration state 700. For example, assuming that the migration state information includes two bits, migration state information can be set to 00 to represent or identify migration state 700. In FIG. 7, the migration information in the page table entry is shown in the callout for migration state 700 as PTE:MS: 0. The page migration engine also sets the RMT migration state information and the lock indicators in the RMT entries for the source page of memory and the destination page of memory to represent or identify migration state 700. In FIG. 7, the RMT migration state information and lock indicators in the RMT entries for the source page of memory and the destination page of memory are shown in the callout for migration state 700 as RMT[S] MS: 0, RMT[S]: 0, RMT[D] MS: 0, and RMT[D] LK: 0. Recall that other information in the RMT entry for the source page was transferred to the RMT entry for the destination page, so the RMT entry for the destination page has the proper access and security information for the migrated page of memory. In addition, the RMT entry for the source page is cleared of the information for the migrated page of memory.

As described above, migration state 700 is the "non-migrating" migration state. Because the migration state information in the page table entry and the RMT entry for the destination page of memory identify the page of memory as being in migration state 700, the IOMMU allows accesses of the page of memory and the respective information in the page table entry from the IO devices to proceed normally. That is, because preparations for migrating the page of memory are not being made and the page of memory is not being migrated, accesses of the page of memory and the information in the page table entry are not prevented, stalled, or otherwise restricted by the IOMMU.

In some embodiments, when returning to migration state 700 (i.e., after updating the page table entry and the RMT entries), the page migration engine signals the software entity that the migration is complete. The software entity then resumes normal operations for the page of memory. For example, the software entity can update the nested page table to identify the page of memory as being present. For example, in some embodiments, the software entity can change validity information (e.g., validity 500) in the nested page table entry and/or other information in the nested page table entry to identify the page of memory as being present. The software entity also updates the page table entry in the nested page table to identify the system physical address where the page of memory is stored. The software entity can then release the page fault mechanisms to enable the processing of any page faults that occurred based on the page of memory having been marked as missing in the nested page table.

Upon returning to migration state 700, the IOMMU releases stalled memory accesses to the page of memory that were previously stalled during prior migration states. For example, in some embodiments, the IOMMU polls/periodically reads the page table entry while stalled memory accesses are held by the IOMMU. When the IOMMU discovers that the page table entry identifies the page of memory as being in migration state 700, the IOMMU begins to acquire the stalled memory accesses in first-in-first-out order from a buffer or memory element where the stalled memory accesses were stored and performs each of the memory accesses. In some embodiments, the IOMMU performs each of the stalled memory accesses before other newly encountered memory accesses of the page of memory (which can themselves be held and subsequently released in the order in which they are received or another order). In addition, the IOMMU resumes caching of the information from the page table entry in local caches. In other words, the IOMMU can itself cache a copy of the information from the page table entry and can provide copies of the information from the page table entry to requesting IO devices. The page migration engine also returns a response to the requesting software entity indicating that the page of memory has been successfully migrated. This completes the migration of the page of memory.

For the example in FIG. 7, it is assumed that the attempt at migration is successful—and thus all the operations for preparing to migrate the page and then migrating the page are successful. If one of the operations were to fail or encounter an undesirable or unexpected condition or error, however, the migration of the page can be terminated. When the migration is terminated, the functional blocks, devices, and software entities return from the current migration state (which can be any of migration states 702-712) to migration state 700. This is shown via corresponding thin arrow-headed lines between migration states 702-710 and migration state 700 and a thick arrow-headed line between migration state 712 and migration state 700. Upon terminating the migration of the page of memory, the software entity, the page migration engine, or another functional block or device restores the migration state information in the page table entry for the page of memory and the RMT entries for the source page of memory and the destination page of memory to bit sequences, values, etc. that represent or identify migration state 700. For example, assuming that the migration state information includes two bits, migration state information can be set to 00 to represent or identify migration state 700, etc. When returning to migration state 700 due to the failure to migrate the page of memory, the IOMMU releases any stalled memory accesses of the page of memory and resumes caching copies of information from the page table entry in local caches in the IOMMU and the IO devices—and, more generally, removes the effects of the preparations for migrating the page of memory. In addition, the page migration engine (and/or another functional block or device) communicates the failure of the migration to the software entity. The software entity can then perform error handling routines (or ignore the failure, if the migration was voluntary).

In some embodiments, despite the restrictions on memory accesses of migrating pages of memory and caching information from the respective page table entries in local caches, accesses to non-migrating pages of memory and their respective page table entries are carried on normally. That is, because preparations for migrating non-migrating pages of memory are not being made and the non-migrating pages of are not to be migrated, accesses of the non-migrating pages of memory and the information in the respective page table entries are not prevented, stalled, or otherwise restricted by the IOMMU. In other words, the IOMMU uses information from such page table entries normally and performs memory accesses of such pages of memory normally. In some embodiments, migration state information and RMT entries for non-migrating pages are set to indicate that the non-migrating pages are in migration state 700. Certain memory accesses of non-migrating pages of memory may, however, be held up for ordering reasons and/or other reasons based on the migration of pages of memory—but can generally proceed as long as the non-migrating pages of memory in the memory and the respective page table entries remain correct.

In some embodiments, the functional blocks, devices, and software entities can transition between migration states in a different order. For example, in some embodiments, migration states can be skipped. An example of the skipping of migration states is shown in FIG. 7 by the "skip migration state(s)" label from migration state 700 (each the possible skips between the migration states are not labeled for clarity). Note that such skipping can involve skipping from any appropriate migration state to any other allowable migration state, as long as the migration state information and the RMT entries for the source page and/or the destination page of memory are updated correctly. For example, in some embodiments, pages of memory that are only accessible to the processor (and thus are not accessible to IO devices) may be transitioned from migration state 700 directly to migration state 712. In these embodiments, the processor includes page fault mechanisms for handling missing pages of memory and the software entity and/or the page migration engine can simply mark the page of memory as missing in the respective page table entry and proceed with migrating the page of memory. In some embodiments, the processor uses a different page table than the IOMMU and thus pages of memory can be marked as "missing" during migration in the processor's page table—which causes the pages of memory to be handled by the processor using the processor's page fault mechanisms. In some embodiments, however, the processor uses the same page table as the IOMMU, albeit with different available indicators for the processor and the IOMMU. In these embodiments, the processor's available indicator can be set to causes the pages of memory to be handled by the processor using the processor's page fault mechanisms, while the page of memory remains "available" for the IOMMU to be handled (via stalling memory accesses, etc.) as described herein.

Although for the example shown in FIG. 7, only a single page of memory is migrated, in some embodiments, preparations for migrating multiple pages of memory and/or migrating the multiple pages of memory can occur in parallel. In other words, using the above-described migration state information and information in the RMT for each page of memory, preparations for migrating two or more pages of memory and/or migrating the two or more pages of memory can be performed at the same or similar times, contemporaneously, etc. Note that the individual pages of memory in this case can be in different migration states—and thus migrations of pages of memory can be commenced dynamically (e.g., as a software entity determines that each page of memory is to be migrated, etc.) and completed in parallel with the preparations for migrating multiple pages of memory and/or migrating of other pages of memory. Each page of memory is thus individually identifiable via its page table entry and respective RMT entries as being in one of the migration states or in the non-migrating state—and operations for handling accesses of the page of memory and/or the page table entry are performed as described herein.

Process for Handling Migrating Pages of Memory

Figure 8:
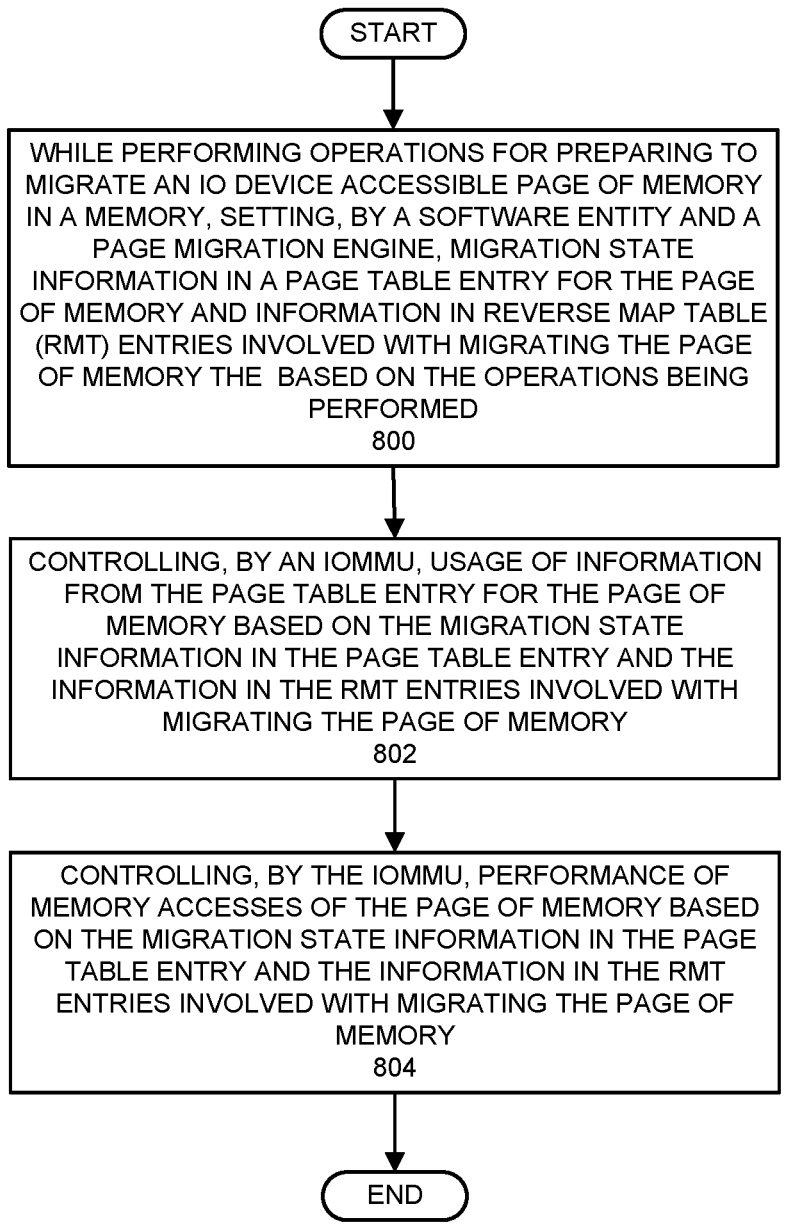
FIG. 8 presents a flowchart illustrating a process for migrating pages of memory in accordance with some embodiments.

In the described embodiments, a software entity (e.g., hypervisor 318, operating system 200, etc.), a page migration engine (e.g., page migration engine 114), and an IOMMU (e.g., IOMMU 140) perform operations for controlling memory accesses of pages of memory and the associated page table entries while preparations are being made for migrating the pages of memory and the pages of memory are migrated in a memory (e.g., memory 104). FIG. 8 presents a flowchart illustrating a process for migrating pages of memory in accordance with some embodiments. FIG. 8 is presented as a general example of operations performed by requesters in some embodiments. In some embodiments, however, requesters perform different operations and/or perform the operations in a different order.

As can be seen in FIG. 8, the process starts when, while performing operations for preparing to migrate an IO device accessible page of memory in a memory, a software entity and a page migration engine set migration state information in a page table entry for the page of memory and information in reverse map table (RMT) entries involved with migrating the page of memory based on the operations being performed (step 800). Generally, for this operation, as the software entity and the page migration engine perform respective operations for preparing to migrate a page of memory, the software entity and the page migration engine update the migration information in a page table entry for the page of memory and the information in the RMT entries involved with migrating the page of memory to indicate a current/present migration state. Recall that the RMT entries involved with migrating the page of memory include RMT entries for a source page of memory (i.e., the page of memory itself) at a first location and a destination page of memory at a second location where the page of memory is to be migrated. In some embodiments, setting the information in the RMT entries involved with migrating the page of memory includes setting a lock indicator and/or RMT migration state information based on the operations being performed (note that some or all of these may not be changed between migration states as shown above for FIG. 7).

As described above, in migration states 702-712, the software entity and/or the page migration engine perform operations for preparing to migrate the page of memory and then, in migration state 712 (which, as described above, might be divided into migration state 712A, in which the existing/outstanding memory accesses of the second type are completed, and 712B, in which the page of memory is migrated/moved in memory and cleanup operations are performed), the page migration engine performs operations for migrating the page of memory. Setting the migration state information in the page table entry for the page of memory and the information in the RMT entries involved with migrating the page of memory based on the operations being performed therefore involves setting the migration state information and the information in RMT entries involved with migrating the page of memory to identify a migration state for the page of memory. For example, after receiving a request to migrate the page of memory, while (or before) performing initial operations to prepare for the migration of the page of memory, the software entity can set the migration state information to migration state 702, such as by setting the migration state to a bit sequence or value that indicates migration state 702. In migration state 702, however, the information in the RMT entries involved with migrating the page of memory is left unchanged from migration state 700 (see the callout for migration state 702 in FIG. 7 for an example).

In some embodiments, the particular operations that are performed by the software entity and the IO device depend on a current migration state for the page of memory. For example, in some embodiments, among the operations performed by the software entity are operations for invalidating (via corresponding commands to the IOMMU) any existing copy of information from the page table entry in a cache in the at least one IO device. In some embodiments, the software entity performs this operation in migration state

702. As another example, in some embodiments, among the operations performed by the page migration engine are operations for invalidating any existing copy of information from the page table entry in a cache in the IOMMU. In some embodiments, the page migration engine performs this operation in migration state 708. As yet another example, in some embodiments, among the operations performed by the page migration engine are operations for completing any memory accesses to the page of memory—that are not stalled by the IOMMU—prior to migrating the page of memory. In some embodiments, the page migration engine performs these operations this operation in migration states 702-712. A sequence/order in which these operations can be performed by the software entity and the page migration engine is described above for FIG. 7.

An IOMMU controls the usage of information from the page table entry based on the migration state information in the page table entry and the information in the RMT entries involved with migrating the page of memory (step 802). For this operation, the IOMMU (or, rather, an IOMMU table walker), upon performing a table walk, acquires the migration state information and information from the RMT entry for the source page of memory and checks the current values of the migration state information and the information from the RMT entry for the source page of memory (e.g., the lock indicator and the RMT migration state information). When the migration state information and the information in the RMT entry for the source page of memory indicate that preparations are being made for migrating the page of memory and/or the page of memory is being migrated, the IOMMU restricts the usage of the information from the page table. For example, in migration states 702-712, the IOMMU can prevent caching of copies of information from the page table entry in caches in the IOMMU itself or in the IO devices. In contrast, when the migration state information and the information in the RMT entry for the source page of memory indicate that the page is not being migrated, such as in migration state 700, the IOMMU can use information from the page table normally. In the non-migration migration state, therefore, the IOMMU can itself cache copies of information from the page table entry and can provide IO devices with copies of information from the page table entry (subject to any other existing access restrictions).

The IOMMU also controls the performance of memory accesses of the page of memory based on the migration state information in the page table entry and the information in the RMT entries involved with migrating the page of memory (step 804). For this operation, the IOMMU, as described above, acquires the migration state information and the information in the RMT entry for the source page of memory and checks the current value of the migration state information and the information in the RMT entry for the source page of memory. When the migration state information and the information in the RMT entry for the source page of memory indicate that preparations are being made for migrating the page of memory and/or the page of memory is being migrated, the IOMMU can restrict memory accesses to the page of memory. For example, in migration states 702-712, the IOMMU can stall specified newly encountered memory accesses to the page of memory—although existing memory accesses are allowed to proceed to completion before the page of memory is migrated. In contrast, when the migration state information and the information in the RMT entry for the source page of memory indicates that the page is in other migration states, such as in migration state 700, the IOMMU can permit memory accesses to the page of memory to proceed normally. In these migration states, therefore, the IOMMU performs memory accesses to the page of memory in a typical way, subject to any other existing access restrictions.

Although FIG. 8 presents an example of setting and using migration state information in the page table entry and the information in the RMT entries as "preparations are made" for migrating a page of memory, in some embodiments, the migration state information in the page table entry and the information in the RMT entries are generally present in the page table entry and the RMT, respectively, and are used for "controlling" accesses of pages of memory and information in the corresponding page table entries in other cases (i.e., in other migration states). For example, for pages of memory for which the "preparations" described in FIG. 8 are completed and the pages of memory are actually being migrated (i.e., are in the process of being moved from one location to another in the memory), the migration state information in the page table entry and the information in the RMT entries are used by the IOMMU for controlling accesses of pages of memory and information in respective page table entries. In some embodiments, the migration of the page of memory is performed in migration state 712—with the above-described controls on accesses of pages of memory and information in respective page table entries. As another example, for pages of memory that are not being migrated, and thus for which no preparations are being made for migrating the page of memory, the migration state information in the page table entry and the information in the RMT entries are used by the IOMMU for controlling accesses of pages of memory and information in respective page table entries. In some embodiments, operations for non-migrating pages of memory are performed in migration state 700—with the above-described controls (or lack thereof) on accesses of pages of memory and information in respective page table entries.

Migrating Processor Only Pages of Memory

In some embodiments, pages of memory can be "processor only" pages of memory, and thus can be pages of memory that are accessible only by processors (e.g., cores 116-118)—and not accessible to IO devices. Because such pages of memory are not accessible to IO devices, at least some of the above-described operations for migrating these pages of memory are performed differently. In some embodiments, for migrating a processor only page of memory, a software entity (e.g., an operating system, a hypervisor, etc.) first updates a page table entry for the page of memory (e.g., in the nested page table) to identify the page as not present. For example, the software entity can set or clear the respective validity information, etc. in the page table entry. The software entity then instructs the page migration engine to commence operations for migrating the page of memory.

Upon receiving the instruction from the software entity, the page migration engine sets the lock indicator in an RMT entry for the source page of memory (i.e., the location in memory where the page of memory is stored before migration) and a destination page of memory (i.e., the location in memory where the page of memory is stored after migration) to identify each RMT entry as locked. Recall that other software entities and functional blocks, upon finding the lock indicator set, should not further access a given RMT entry and/or the associated page of memory. The page migration engine also invalidates any cached copy of the RMT entry for the source page of memory and/or the RMT entry for the destination page of memory in caches (e.g., TLBs) in the processor to ensure that the processor does not incorrectly use an outdated copy of these RMT entries. Because copies of the RMT entry for the source page of memory and/or the RMT entry for the destination page of memory are not present in cache(s) in the processor, the processor will need to check the respective RMT entry itself during any memory access operations during migration—and will therefore find the current version of the respective RMT entry with the lock indicator set.

After locking the RMT entries for the source page of memory and the destination page of memory and clearing copies of the RMT entries from the caches, the page migration engine migrates the page of memory. In other words, the page migration engine moves the data from the source page of memory to the destination page of memory. After migrating the page of memory, the page migration engine transfers information from the RMT entry for the source page of memory to the RMT entry for the destination page of memory and clears the RMT entry for the source page of memory. By transferring the information as described, the page migration engine "migrates" the control, access, and security information for the page of memory to the RMT entry for the destination page of memory and removes information about the page of memory from the RMT entry for the source page of memory (to avoid impermissible duplication of the information). The page migration engine also unlocks the RMT entry for the destination page of memory by clearing the lock indicator in the RMT entry for the destination page of memory.

After the above-described operations are completed, the page of memory has been successfully migrated. The page migration engine therefore signals the software entity that the page of memory has been migrated, i.e., that the migration is completed. The software entity updates the page table entry for the page of memory to reflect the migration, e.g., sets a new physical address for the page of memory associated with the destination page of memory, etc. The page migration engine also sets the page table entry to identify the page of memory as present.

Although certain operations are described above for migrating a processor only page of memory, in some embodiments, different operations are performed and/or operations are performed in a different order. For example, in some embodiments, the page migration engine (and not the software entity) makes the updates to the page table entry. In these embodiments, the software entity (or another software entity or functional block) may simply request the page migration engine to migrate the page of memory and the page migration engine may perform the operations for migrating the page of memory. As another example, in some embodiments, the page table entry itself is not marked as not present (and the page table entry may remain unchanged during the migration). In these embodiments, setting the RMT entries as locked is sufficient to prevent undesired processor accesses of the page of memory during the migration.

In some embodiments, at least one electronic device (e.g., electronic device 100, etc.) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
a memory;
an input-output memory management unit (IOMMU);
a processor that executes a software entity; and
a page migration engine, wherein:
the software entity and the page migration engine are configured to perform operations of preparing to migrate, in the memory, a page of memory that is accessible by at least one IO device, the software entity and the page migration engine setting, based on the operations being performed, (i) migration state information in a page table entry of the page of memory and (ii) information in reverse map table (RMT) entries involved with migrating the page of memory; and
the IOMMU is configured to control, based on the migration state information in the page table entry and the information in the RMT entries, (i) usage of information from the page table entry and (ii) performance of memory accesses of the page of memory.

2. The electronic device of claim 1, wherein the RMT entries involved with migrating the page of memory include RMT entries for:
a source location in the memory where the page of memory is located; and
a destination location in the memory where the page of memory is to be migrated.

3. The electronic device of claim 1, wherein, when setting the information in the RMT entries, the page migration engine is configured to:
set RMT migration state information and a lock indicator in each of the RMT entries based on the operations being performed.

4. The electronic device of claim 1, wherein, when setting the migration state information in the page table entry and the information in the RMT entries, the software entity and the page migration engine are configured to:
set, by the software entity and the page migration engine, the migration state information and/or the information in the RMT entries to values that, when read by the IOMMU, cause the IOMMU to control usage of the information from the page table entry by:
not storing copies of the information from the page table entry in a cache in the IOMMU; and
not providing copies of the information from the page table entry to the at least one IO device to be stored in a cache in the at least one IO device.

5. The electronic device of claim 4, wherein, when performing the operations of preparing to migrate the page of memory, the software entity and the page migration engine are configured to:
invalidate, by the software entity, any existing copy of the information from the page table entry in the cache in the at least one IO device; and
invalidate, by the page migration engine, any existing copy of the information from the page table entry in the cache in the IOMMU.

6. The electronic device of claim 1, wherein, when setting the migration state information in the page table entry and the information in the RMT entries, the page migration engine is configured to:
set the migration state information and the information in the RMT entries to first values that, when read by the IOMMU, cause the IOMMU to control performance of the memory accesses of the page of memory by:
stalling newly encountered memory accesses of a first type to the page of memory, but permitting (i) existing memory accesses of the first type and a second type and (ii) newly encountered memory accesses of the second type to the page of memory to proceed.

7. The electronic device of claim 6, wherein, when setting the migration state information in the page table entry and the information in the RMT entries, the page migration engine is configured to:
set the migration state information and the information in the RMT entries to second values that, when read by the IOMMU, cause the IOMMU to control performance of the memory accesses of the page of memory by:
stalling newly encountered memory accesses of both the first type and the second type to the page of memory, but permitting existing memory accesses of the first type and the second type to the page of memory to complete.

8. The electronic device of claim 7, wherein, when performing the operations of preparing to migrate the page of memory, the page migration engine is configured to:
ensure that any memory accesses of the first type and the second type to the page of memory that are not stalled are completed prior to migrating the page of memory.

9. The electronic device of claim 1, wherein the page migration engine is further configured to perform the operations of migrating the page of memory, the operations including:
moving the page of memory from a first location to a second location in the memory; and
after the moving is completed:
updating the information in the page table entry to identify the page of memory as being stored at the second location in the memory; and
setting the migration state information and the information in the RMT entries to values that, when read by the IOMMU, cause the IOMMU to resume using the information from the page table entry normally and performing memory accesses of the page of memory normally.

10. The electronic device of claim 9, wherein the RMT entries include an RMT entry for a source location in the memory where the page of memory is located and an RMT entry for a destination location in the memory where the page of memory is to be migrated, and wherein, when setting the information in the RMT entries, the page migration engine is configured to:

overwrite specified information in the RMT entry for the destination location with a copy of the specified information that is acquired from the RMT entry for the source location; and remove the specified information from the RMT entry for the source location.

11. A method for migrating a page of memory in a memory in an electronic device, the method comprising:
when performing operations of preparing to migrate, in the memory, a page of memory that is accessible by at least one IO device, setting, based on the operations being performed, (i) migration state information in a page table entry of the page of memory and (ii) information in reverse map table (RMT) entries involved with migrating the page of memory; and
controlling, based on the migration state information in the page table entry and the information in the RMT entries, (i) usage of information from the page table entry and (ii) performance of memory accesses of the page of memory.

12. The method of claim 11, wherein the RMT entries involved with migrating the page of memory include RMT entries for:
a first location in the memory where the page of memory is located; and
a second location in the memory where the page of memory is to be migrated.

13. The method of claim 11, further comprising, when setting the information in the RMT entries:
setting RMT migration state information and/or a lock indicator in each of the RMT entries based on the operations being performed.

14. The method of claim 11, wherein setting the migration state information in the page table entry and the information in the RMT entries includes:
setting the migration state information and/or the information in the RMT entries to values that, when read by the IOMMU, cause the IOMMU to control usage of the information from the page table entry by:
not storing copies of the information from the page table entry in a cache in the IOMMU; and
not providing copies of the information from the page table entry to the at least one IO device to be stored in a cache in the at least one IO device.

15. The method of claim 14, wherein preparing to migrate the page of memory includes:
invalidating, any existing copy of the information from the page table entry in the cache in the at least one IO device; and
invalidating any existing copy of the information from the page table entry in the cache in the IOMMU.

16. The method of claim 11, wherein setting the migration state information in the page table entry and the information in the RMT entries includes:
setting the migration state information and the information in the RMT entries to first values that, when read by the IOMMU, cause the IOMMU to control performance of the memory accesses of the page of memory by:
stalling newly encountered memory accesses of a first type to the page of memory, but permitting (i) existing memory accesses of the first type and a second type and (ii) newly encountered memory accesses of the second type to the page of memory to proceed.

17. The method of claim 16, wherein setting the migration state information in the page table entry and the information in the RMT entries includes:
setting the migration state information and the information in the RMT entries to second values that, when read by the IOMMU, cause the IOMMU to control performance of the memory accesses of the page of memory by:
stalling newly encountered memory accesses of both the first type and the second type to the page of memory, but permitting existing memory accesses of the first type and the second type to the page of memory to complete.

18. The method of claim 17, wherein preparing to migrate the page of memory includes:
ensuring that any memory accesses of the first type and the second type to the page of memory that are not stalled are completed prior to migrating the page of memory.

19. The method of claim 11, further comprising performing the operations of migrating the page of memory, the operations including:
moving the page of memory from a first location to a second location in the memory; and
after the moving is completed:
updating the information in the page table entry to identify the page of memory as being stored at the second location in the memory; and
setting the migration state information and the information in the RMT entries to values that, when read by the IOMMU, cause the IOMMU to resume using the information from the page table entry normally and performing memory accesses of the page of memory normally.

20. The method of claim 19, wherein the RMT entries include an RMT entry for a source location in the memory where the page of memory is located and an RMT entry for a destination location in the memory where the page of memory is to be migrated, and wherein the method further comprises:
when setting the information in the RMT entries:
overwriting specified information in the RMT entry for the destination location with a copy of the specified information that is acquired from the RMT entry for the source location; and
removing the specified information from the RMT entry for the source location.

21. An electronic device, comprising:
a memory;
a processor; and
a page migration engine, wherein:
the page migration engine is configured to perform operations of preparing to migrate and migrating a page of memory in the memory, the page migration engine setting, based on the operations being performed, a lock indicator in reverse map table (RMT) entries involved with migrating the page of memory; and
the processor is configured to control performance of memory accesses of the page of memory based on the lock indicator in the RMT entries.

22. The electronic device of claim 21, wherein:
the processor executes a software entity;
the software entity or the page migration engine sets a page table entry for the page of memory to identify the page of memory as not present in the memory while the page migration engine performs the operations of preparing to migrate and migrating the page of memory in the memory; and the processor is configured to control the performance of memory accesses of the page of memory and/or usage of information in the page table entry based on the page of memory being identified as not present.

\* \* \* \* \*